(12) United States Patent
Ayala et al.

(10) Patent No.: US 7,502,763 B2
(45) Date of Patent: Mar. 10, 2009

(54) ARTIFICIAL NEURAL NETWORK DESIGN AND EVALUATION TOOL

(75) Inventors: Melvin Ayala, Hollywood, FL (US); Malek Adjoundi, Miami, FL (US)

(73) Assignee: The Florida International University Board of Trustees, Miami, FL (US)

(*) Notice: Subject to any disclaimer, the term of this patent is extended or adjusted under 35 U.S.C. 154(b) by 0 days.

(21) Appl. No.: 11/203,510

(22) Filed: Aug. 12, 2005

(65) Prior Publication Data

US 2007/0094168 A1 Apr. 26, 2007

Related U.S. Application Data

(60) Provisional application No. 60/703,828, filed on Jul. 29, 2005.

(51) Int. Cl.
*G06N 5/00* (2006.01)
(52) U.S. Cl. ............................................. 706/6; 706/45
(58) Field of Classification Search .................. 706/15, 706/21, 25, 6; 704/253; 382/157
See application file for complete search history.

(56) References Cited

U.S. PATENT DOCUMENTS

| | | | | |
|---|---|---|---|---|
| 5,461,699 A | * | 10/1995 | Arbabi et al. | 706/21 |
| 5,590,218 A | * | 12/1996 | Ornstein | 382/157 |
| 5,594,834 A | * | 1/1997 | Wang | 704/253 |
| 5,598,510 A | * | 1/1997 | Castelaz | 706/25 |

OTHER PUBLICATIONS

CorMac Technologies Inc. website main page, http://www.cormactech.com/bodyframe.html, pp. 1-11 (2006).

CorMac Technologies Inc. NeuNet Pro website page, "Specifications for Neural Network Software," http://cormactech.com/neunet/specifications.html, pp. 1-2 (2006).

Demuth, et al., "*Neural Network Toolbox for Use with MATLAB*", User's Guide, Version 4, TheMathWorks, Inc., pp. cover-xxviii, and 3-23-3-32 (1992-2005).

Dendronic Decisions Limited, "ALNfit Pro", http://www.dendronic.com/downloadalnfit_pro.shtml, pp. 1-3 (Feb. 2005).

Dendronic Decisions Limited, "ALNfit Pro Features", http://www.dendronic.com/features.htm (Jul. 2005).

Dendronic Decisions Limited website page, "Products and Services," http://www.dendronic.com/products.htm, pp. 1-2 (2003).

The MathWorks website page, "The Math Works—Neural Network Toolbox 4.0.5—Introduction and Key Features," http://www.mathworks.com/products./neuralnet/description1.html, p. 1 of 1 (1994-2005).

The MathWorks website page, "The Math Works—Neural Network Toolbox 4.0.5—Latest Features," http://www.mathworks.com/products/neuralnet/whatsnew.html, p. 1 of 1 (1994-2005).

(Continued)

*Primary Examiner*—Wilbert L Starks, Jr.
(74) *Attorney, Agent, or Firm*—Marshall, Gerstein & Borun LLP

(57) ABSTRACT

Disclosed herein is a programming tool stored on a computer-readable medium and adapted for implementation by a computer for designing an artificial neural network. The programming tool includes a network configuration module to provide a first display interface to support configuration of the artificial neural network, and a pattern data module to provide a second display interface to support establishment and modification of first and second pattern data sets for training and testing the artificial neural network, respectively.

28 Claims, 24 Drawing Sheets

OTHER PUBLICATIONS

The MathWorks website page, "The Math Works—Neural Network Toolbox 4.0.5—Neural Network Toolbox GUI," http://www.mathworks.com/products/neuralnet/description3.html, p. 1 of 1 (1994-2005).

The MathWorks website page, "The Math Works—Neural Network Toolbox 4.0.5—Pre- and Post-Processing Functions and Improving Generalization," http://www.mathworks.com/products/neuralnet/description6.html, p. 1 of 1 (1994-2005).

The MathWorks website page, "The Math Works—Neural Network Toolbox 4.0.5—Simulink Support and Control System Applications," http://www.mathworks.com/products/neuralnet/description5.html, pp. 1-2 (1994-2005).

The MathWorks website page, "The Math Works—Neural Network Toolbox 4.0.5—Supported Network Architectures and Training and Learning Functions," http://www.mathworks.com/products/neuralnet/description4.html, (1994-2005).

The MathWorks, "The Math Works—Neural Network Toolbox 4.0.5—Working with Neural Networks," http://www.mathworks.com/products/neuralnet/description2.html, p. 1 of 1 (1994-2005).

Attrasoft, "Attrasoft Boltzmann Machine (ABM) for Windows 95/98", attrasoft.com/abm, pp. 1-3 (1998).

* cited by examiner

FIG. 11

ARTIFICIAL NEURAL NETWORK DESIGN AND EVALUATION TOOL

RELATED APPLICATION

This application claims the benefit of U.S. provisional application Ser. No. 60/703,828 entitled "Artificial Neural Network Design and Evaluation Tool," which was filed on Jul. 29, 2005, the disclosure of which is hereby incorporated by reference in its entirety.

STATEMENT REGARDING FEDERALLY SPONSORED RESEARCH OR DEVELOPMENT

This invention was made with government support under Awards Nos.: EIA-9906600 and N00014-99-1-0952 from the National Science Foundation and the Office of Naval Research, respectively. The government has certain rights in the invention.

BACKGROUND OF THE DISCLOSURE

1. Field of the Disclosure

The present invention relates generally to artificial neural networks and, more particularly, to the design and evaluation of artificial neural networks.

2. Brief Description of Related Technology

Recent advances in artificial intelligence and other fields have benefited from the problem solving capabilities of artificial neural networks in such areas as pattern recognition, association and classification. Artificial neural networks have also been relied upon in applications such as forecast studies, parameter identification and process control, to name but a few. Indeed, the wide range of applications enabled by artificial neural networks has not been limited to a few, specialized contexts, but rather expanded from areas like industrial equipment into a number of commercial products like automobiles and household appliances.

Artificial neural network theory can only be efficiently applied to practical problems with the use of computers. Various programming tools have therefore been developed and put in use in university, industry, or other settings to design or create the artificial neural networks later put into practice.

Despite the wide and advantageous use of artificial neural networks in artificial intelligence and other fields, the programming tools available for designing artificial neural networks are limited either in functionality, user friendliness, or both. Efforts to provide user friendly tools may be complicated by aspects of artificial neural network theory itself, including, for instance, the complex mathematics involved. Nonetheless, past programming tools often complicate the process further by requiring programming in proprietary script or other languages. The user must accordingly first master the programming language before even beginning the work toward programming (or designing) the artificial neural network. Such requirements and other non-user friendly details may then obscure aspects and features of artificial neural networks to the user in training, as well as frustrate implementation and use for more experienced users.

The data processing requirements of artificial neural networks have likely been another source of complications for academic and other efforts to design artificial neural networks. More specifically, a considerable amount of data often needs to be processed to train an artificial neural network. Academic and other efforts that would benefit from observation and analysis of the processing steps directed toward one network, and preferably many networks, may be impeded by difficulties arising from the creation, handling and processing of the training data. In fact, the inability to teach students with examples has limited the usefulness of current artificial neural network software design solutions. Thus, the entry, handling and other processing of the data sets have acted as a barrier against effective teaching of network theory.

One widely used artificial neural network programming tool is provided as a toolbox within the MATLAB software package available from The MathWorks, Inc. (Natick, Mass., www.mathworks.com). Unfortunately, knowledge of MATLAB's script language is generally required in order to access the full suite of programming options and features of the toolbox. Making matters worse, the user is forced to enter the script language instructions via a command line. Thus, the design and other programming of artificial neural networks is at times inconvenient and slow, even when the scripting language may be familiar to the user.

The MATLAB toolbox also provides a network/data manager to support the implementation of certain programming tasks outside of the command line. Unfortunately, the network/data manager does not present or support all of the functionality available via the toolbox, thereby forcing the user to utilize the command line at times. As a result, the network/data manager is primarily useful as a preliminary interface for users designing networks and data sets of relatively low complexity.

More generally, the artificial neural network programming tools commercially available for use in research, industry or education often fail to provide comprehensive coverage of the artificial neural network field in the sense that, for instance, not all network types are supported or, for those types that are supported, the designs are limited due to the absence of design options, training features, etc. For example, ALNfit Pro, a software tool available from Dendronic Decisions Ltd. (Edmonton, Alberta, www.dendronic.com), generally supports one network type, an adaptive logic network (ALN), that utilizes a single type of multilayer perceptron, or feedforward network, for application only to Boolean function-based computations. Moreover, the graphical user interface generated by ALNfit Pro provides a limited number of options for configuration and training. The programming interface provided by Attrasoft, Inc. (Savannah, Ga., attrasoft.com), and its Attrasoft Boltzmann Machines (ABM) software, is similarly limited, insofar as the software supports only two network types, the Hopfield Model and the Boltzmann Model.

SUMMARY OF THE DISCLOSURE

In accordance with one aspect of the disclosure, a programming tool is stored on a computer-readable medium and adapted for implementation by a computer for designing an artificial neural network. The programming tool includes a network configuration module to provide a first display interface to support configuration of the artificial neural network, and a pattern data module to provide a second display interface to support establishment and modification of first and second pattern data sets for training and testing the artificial neural network, respectively.

In some embodiments, the second display interface includes first and second editable tables to support viewing and entering the first and second pattern data sets, respectively. The pattern data module may then include an automatic table setup routine for configuring the first editable table or the second editable table in accordance with the configuration of the artificial neural network.

The pattern data module may include a data plotting routine such that the second display interface comprises a graph for viewing the first pattern data set or the second pattern data set. Alternatively or additionally, the pattern data module may include a pattern data generation routine to support the establishment of the first pattern data set or the second pattern data set graphically via user selection of cells of a two-dimensional space presented visually in the second display interface.

In some cases, the pattern data module may include a pattern data analysis routine that identifies duplicative and conflicting patterns within either the first pattern data set or the second pattern data set. Alternatively or additionally, the pattern data module may include a pattern data analysis routine that identifies unnecessary variables of either the first pattern data set or the second pattern data set. In either case, the pattern data analysis may be referred to herein as "sensitivity analysis" of the pattern data sets.

The pattern data module may include a pattern data randomization routine to support the establishment or the modification of a selected portion of either the first pattern data set or the second pattern data set with random data values. In some cases, the programming tool may then further include a random number generation module to provide a third display interface to support selection of one of a plurality of random number generation functions for use in determining the random values.

In some embodiments, the second display interface supports selection of a subset of the first pattern data set for validation testing of the artificial neural network. The second pattern data set may, in fact, be a subset of the first pattern data set. The second display interface may support adjustment(s) to validation testing timing.

The second display interface may present a tool for implementing generalization testing on the first and/or the second pattern data set to compute classification error for the artificial neural network. The programming tool may also further include a network evaluation module to provide a third display interface for generation of a performance metric of the artificial neural network based on the generalization testing.

In some cases, the network configuration module includes a neuron configuration tool to select and configure one of a plurality of neurons of the artificial neural network. The neuron configuration tool may then include an input panel to specify for the selected neuron an activation function, a bias, a learning rate, or a weight. The programming tool may then further include an activation function customization module to establish one or more parameters for the activation function. A slope parameter of the activation function may then be optimized via training of the artificial neural network via the first pattern data set.

The programming tool may further include a code display module to provide a third display interface to present code indicative of an algorithm used in training the artificial neural network.

The first display interface may include a graphical editing panel to support topographical configuration of the artificial neural network via placement of graphical representations of network components on the graphical editing panel.

In accordance with another aspect of the disclosure, a programming tool stored on a computer-readable medium and adapted for implementation by a computer for designing an artificial neural network includes a network configuration module, a pattern data module, and a network evaluation module. The network configuration module provides a first display interface to support configuration of the artificial neural network, while the pattern data module provides a second display interface to support establishment of a pattern data set for testing of the artificial neural network. The network evaluation module then provides a third display interface to generate a performance metric based on the testing of the artificial neural network.

The network evaluation module may include a routine to implement receiver operating characteristics (ROC) analysis such that the performance metric comprises an indication of classification performance. Alternatively or additionally, the network evaluation module includes a routine to implement confusion matrix analysis. In cases where the artificial neural network is designed for two-category classification, the programming tool may further include a support vector machines module to provide a performance comparison for the artificial neural network.

The first display interface may include a graphical editing panel to support topographical configuration of the artificial neural network via placement of graphical representations of network components on the graphical editing panel.

In some embodiments, the programming tool further includes a supervised learning module having a tool to pause training of the artificial neural network for viewing status information for components of the artificial neural network at an intermediate phase of the training.

In cases where the artificial neural network is a feedforward network, the network evaluation module may include a decision function tool to provide a graphical representation of discriminant planes of the feedforward network.

BRIEF DESCRIPTION OF THE DRAWING FIGURES

For a more complete understanding of the invention, reference should be made to the following detailed description and accompanying drawing wherein:

FIG. 11 is a simplified depiction of an exemplary window of a display interface generated by the network configuration module of FIG. 1 that provides a supervised learning tool in support of training a multilayer neural network using one or more of the pattern data sets or a selected training function;

Figure 1:
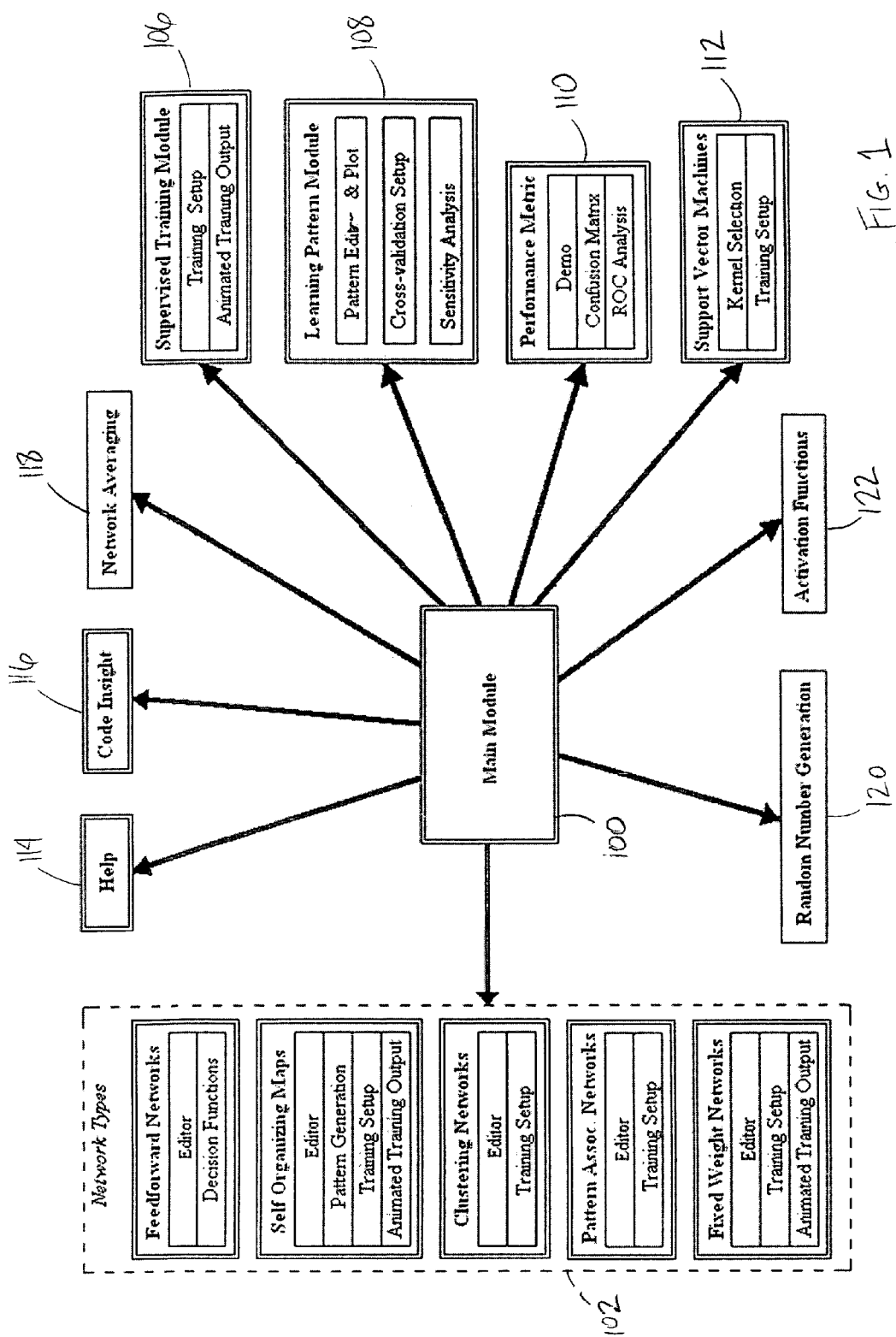
FIG. 1 is a flow diagram representation of an artificial neural network design and evaluation application in accordance with an embodiment having a main module from which a number of other modules and tools may be accessed, including a network configuration module, a learning pattern module, and a performance metric module.

While the disclosed programming tool is susceptible of embodiments in various forms, there are illustrated in the drawing (and will hereafter be described) specific embodiments of the programming tool, with the understanding that the disclosure is intended to be illustrative, and is not intended to limit the invention to the specific embodiments described and illustrated herein.

DETAILED DESCRIPTION OF PREFERRED EMBODIMENTS

Described herein is an artificial neural network programming tool that generally addresses the complexities and limitations of the software generally available to support the design of artificial neural networks. By simplifying and facilitating the process of neural network design, the disclosed programming tool is well suited for academic purposes and users in training, as well as for use in industry and research. Despite the complexities of artificial neural networks and the computations involved in the training thereof, the disclosed programming tool generally provides a user friendly and convenient graphical user interface for the design, simulation and evaluation of a number of artificial neural network types. To that end, the graphical user interface establishes a programming environment that does not require the user to be familiar with or utilize a programming script to create or train the neural network. The disclosed programming tool may thus be ideal for those users (e.g., students) either learning aspects or features of artificial neural networks, or having limited prior experience with the code or programming language in which such networks are typically realized.

While the disclosed programming tool is particularly well suited for use in teaching or academic efforts, practice of the disclosed programming tool is not limited to any such context. Rather, the disclosed programming tool includes a number of features and functionality, as described herein below, useful in a wide range of contexts, such as industrial applications and other applications requiring high-speed calculation processing.

The disclosed programming tool generally includes a number of modules that generate respective display interfaces to support various neural network design, simulation, and evaluation activities and functions. Each module may be directed to the generation of a number of display interfaces, and a particular module may be involved in one or more aspects spanning the design, simulation, and evaluation of a neural network. More generally, the display interfaces may be provided to a user via any display device as part of, for instance, a broader graphical user interface, which may, but need not, be generated via any one of the number of conventional windows-based computing environments available, such as any one of those environments based on operating systems commercially available from Microsoft Corp. In any case, and regardless of the specific operating system or environment, the display interfaces generated by the modules of the disclosed programming tool, when taken together, support the user-initiated design, simulation, and evaluation of a number of different types of artificial neural networks.

As described below, the disclosed programming tool includes a network configuration module to support the configuration of an artificial neural network via one or more display interfaces made available to a user. The display interface(s) may further support simulation of the configured artificial neural network by, for instance, evaluation or testing thereof. The display interface(s) may also support the establishment and modification of pattern data sets to be used in training or testing the artificial neural network. More generally, the display interfaces supporting (i) the establishment of pattern data sets, and (ii) the evaluation or testing of the artificial neural network, may be generated by modules other than the network configuration module. Thus, in some embodiments, a pattern data module may provide one or more display interfaces dedicated to the establishment and modification of the pattern data sets. And in some cases, a network evaluation module may provide one or more display interfaces to support the evaluation or testing of the artificial neural network by, for instance, generating a performance metric based on such testing.

As alluded to above and described below, the aforementioned modules of the programming tool may provide functionality via the display interfaces in a manner that is integrated to any desired extent. For example, the network configuration module for a particular network type may provide simulation functionality that supports the evaluation of the configured artificial neural network, despite the availability of a further display interface generated by the network evaluation module for generation of a performance metric based on the testing via such simulation. Nevertheless, the disclosed programming tool provides a number of display interfaces for network configuration, pattern data management, and network evaluation, all of which support the simulation and application of a number of different artificial neural network types, regardless of which specific module of the disclosed programming tool is implemented in connection with the generation of a particular display interface or display interface element (e.g., a panel; dialog box, etc.).

Each display interface may include one or more separate windows and, in some cases, a single window may include multiple panels or sections displayed concurrently. The panels, sections or other elements or aspects of a window may be directed and dedicated to multiple, different display interfaces. To that end, one window may enable the generation or rendering of additional windows, dialog boxes, panels, or other interface elements, as is typical in conventional windows operating environments. As a result, the display interfaces provided by the modules of the disclosed programming tool may, but need not, form or correspond with a number of respective windows (or respective sets of windows) made available under a single software application, the windows being accessible via typical graphical user interface mechanisms, such as drop-down menus, right click operations, etc. However, practice or implementation of the disclosed programming tool is not limited to any particular application or other framework and, as such, may be implemented in a distributed or other non-integrated fashion, such that the display interfaces provided by the modules thereof are provided as parts of different applications, on different display devices, or in any other desired manner.

With reference now to the drawing figures, where like elements are identified with like reference numerals, FIG. 1 depicts an exemplary application framework for the disclosed programming tool. In this exemplary embodiment, the functionality provided by a number of modules is accessed either directly or indirectly via a main module 100. For example, a number of network programming or configuration modules collectively indicated at 102 may be accessed via the main module 100, as described below in greater detail. The main module 100 may also provide access to a supervised training module 106, a learning pattern module 108, a performance evaluation module 110, and a support vector machines module 112. Each of the modules 106, 108, 110, and 112 may support the configuration, simulation and other functionality provided by the network configuration modules 102 and, accordingly, be referred to herein as "support modules" or "configuration tools." The disclosed programming tool may include a number of additional support modules directed to supporting programming tasks in configuring, simulating or evaluating the artificial neural network, as well as to assist the user in configuring or using the application itself. These types of support modules may include a help module 114, a code insight module 116, a network averaging module 118, a random number generation module 120, and an activation function customization module 122.

References to the different terms "support modules" and "configuration tools" are made for convenience only, and to distinguish, for instance, such modules and tools from the network configuration modules 102. Any one of the aforementioned non-network configuration modules or other components of the disclosed programming tool may be considered a support module or configuration tool depending on the operational or other context being described. For example, the activation function customization module 122 may act as a standalone module in generating a separate or dedicated display interface when accessed (or implemented) via the main module 100. Actions facilitated by that display interface may, for instance, establish the parameters for customized activation functions to be utilized by one or more of the network configuration modules 102. Despite the standalone nature of such functionality, the activation function customization module 122 may alternatively or additionally be implemented during the configuration of a network as one of several configuration tools made available via the display interface generated by the network configuration module 102. Thus, any one of the aforementioned non-network configuration modules or tools may be integrated, accessed or made a part of any one or more of the network configuration modules 102, as desired. In FIG. 1, some of the support modules having such dual functionality in the exemplary embodiment shown are indicated with a single line border. In alternative embodiments, one or more additional modules may be accessed in such manners as well.

As shown in FIG. 1, a number of the modules include sub-modules or components that may generate dedicated display interfaces or windows for the module. For example, each one of the network configuration modules 102 includes an editor, or editor interface, that generates one or more display interfaces to support the creation and editing of the artificial neural network being configured. Each of the editor interfaces generally supports the configuration of the artificial neural network graphically rather than via entry of programming script or commands. In some cases, the editor interface may provide a panel or pallet for graphically establishing the structure or topology of the artificial neural network, while other editor interfaces may provide such configuration functionality via a number of input data panels, tables, and other graphical user interface selection items.

A number of the network configuration modules 102 may also include a training setup interface to support the establishment or parameters and other features of the training step or steps taken for the artificial neural network being configured. Generally speaking, the training setup interface may provide a number of options for user selection to configure the training operation, such as an identification of a training algorithm, training algorithm parameters, learning rates, visualization parameters, and stop criteria. For example, the network configuration module 102 directed to self-organizing maps may have a training setup interface having a number of panels for specification of the organizing technique, training visualization, and stop criteria. The organizing technique panel may provide a user with an opportunity to specify the details of the weight adjustment formula and its constituent functions and parameters. The visualization panel of the interface may allow the user to specify such parameters as a time delay, neuron interconnections visualization, a connection type, a minimal distance between connections, and whether to show diagonal grid connections. The stop criteria panel of the interface may allow the user to specify a number of iteration steps, a threshold error, and a number of patterns or iterations, after which training is stopped. Stopping the training process may be directed to, for example, pausing the calculations to allow the viewing of intermediate or temporal results, to test for convergence issues, or for a debugging opportunity. Other training setup interfaces of the network configuration modules 102 may allow the user to specify a learning rate, a Euclidean radius, whether to normalize inputs, a clustering technique (centroids polyhedra, or linkage dependent), or a method calculation rule (Hebb rule or Delta rule), or a cooling schedule having an initial temperature and temperature decrement. Generally speaking, the training setup interface is adapted and configured to suit the type of artificial neural network being designed. Further examples are set forth below.

As shown in FIG. 1, some of the network configuration modules 102 may also include an animated training output interface to provide information to the user as the network is being configured. Such information may be provided graphically or via data tables. For example, in the self-organizing maps module 102, the animated training output interface includes a panel for displaying an output map that depicts the training results on a graphical plot. Additional panels may be provided to display data for the neuron weights of the grid to which the self organizing map is being trained, as well as a panel showing a table of neighbor neurons. The output interface may provide the option of visualizing the graphical outputs after each calculation step, at specified points or levels, or under specified conditions, as set forth in, for instance, the stop criteria established via another interface or interface component generated by the network configuration module 102.

One or more of the network configuration modules 102, such as the module directed to configuring self-organizing maps, may also include a pattern generation interface to support user definition of the pattern to which the network (e.g., self organizing map) is to be trained. To that end, the interface may include a grid over which a mouse or other pointer or indicator may be moved by the user to select or unselect cells thereof via, for instance, a mouse click. For example, moving the mouse pointer over the grid while holding down the left button of the mouse may provide an convenient and efficient mechanism for pattern (or pattern data) generation, especially in comparison with network data managers requiring the input of data manually by the user for a large number of data points or a large pattern data set.

Some of the network configuration modules 102 may rely on separate, dedicated support modules or configuration tools to address the need for pattern generation, training and training setup, as well as training output. In the exemplary embodiment of FIG. 1, such pattern generation and training functionality may be alternatively or additionally provided via the supervised training module 106 and the learning pattern module 108. However, the disclosed programming tool is not limited to the exemplary embodiment shown in FIG. 1, insofar as the separation or integration of such functionality may vary from the depicted arrangement. Nonetheless, some network configuration modules 102, such as the module directed to feedforward networks, may benefit from interface arrangements that separate pattern generation and training interface functionality due to the complexity or large number of options available to the user in connection therewith. Specifically, the supervised training module 106 and the learning pattern module 108 may be relied upon to customize the use of pattern data and the generation thereof for the network being configured, respectively. To that end, the supervised training module 106 may include training setup and animated training output interfaces similar in a general sense to those interfaces of the network configuration modules having such functionality presented in an integrated fashion with the network configuration functionality.

In the embodiment of FIG. 1, the learning pattern module 108 may be used as the source of training pattern data for any one of the network types supported by the network configuration modules 102. That is, the integrated, dedicated pattern generation interface of some network configuration modules 102 need not constitute the sole source for pattern data for such modules. In addition to pattern data set(s) directed to training, the learning pattern module 108 may further provide pattern data set(s) for testing the artificial neural networks configured via the modules 102. To these ends, the learning pattern module 108 may include display interfaces to support pattern data set division, partitioning and other editing, as well as cross validation setup and sensitivity analysis. Further details regarding the functionality of the learning pattern module 108 are provided below in connection with one or more exemplary display interfaces.

More generally, each of the support modules shown in FIG. 1 may include a number of routines, instruction sets, procedures, etc. directed to the generation of display interfaces dedicated to different functionality made available thereby. These display interfaces may facilitate the performance evaluation of an artificial neural network designed via one of the network configuration modules 102. For instance, the performance evaluation module 110 may generate multiple display interfaces (or display interface elements) directed to supporting network evaluation via confusion matrix analysis and receiver operating characteristics (ROC) analysis. The support vector machines module 112 may also generate such display interfaces and elements to support the selection of configuration options, training data setup, etc. Once configured, the support vector machine may be relied upon by the user in a performance comparison with an artificial neural network designed by one of the other network configuration modules 102.

Figure 2:
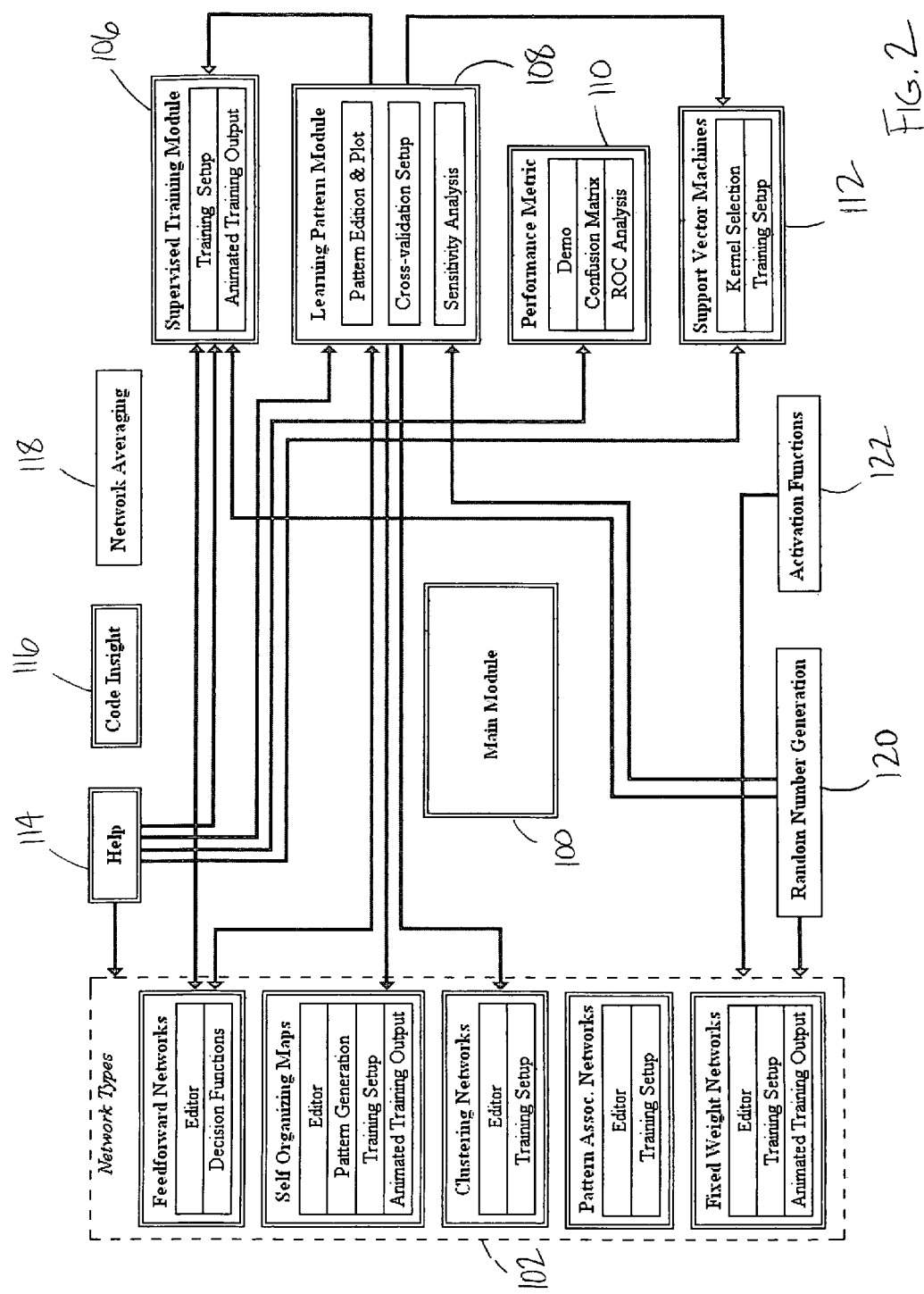
FIG. 2 is another flow diagram representation of the artificial neural network design and evaluation application of FIG. 1 depicting data flow and other interaction between the modules and tools of the application.

With reference now to FIG. 2, the various network configuration modules 102, support modules and configuration tools may be interconnected to support communication paths for inter-module processing or data sharing or, more generally, to support any functionality provided by multiple modules. To these ends, each interconnection shown in FIG. 2 may be indicative of data communication, memory or other access or implementation of a routine (e.g, a procedure call). Interaction between the modules and tools, however, is not limited to the interconnections shown in FIG. 2, but rather may involve two-way, or bi-directional, data communications between already connected modules, or other direct or indirect connections not shown. Thus, the directional nature of the interconnection lines shown in FIG. 2 (via arrows) may depict or indicate the main or primary flow of information between the modules or tools. For instance, as a support module, the learning pattern module 108 is primarily provided to generate, establish or modify one or more pattern data sets utilized by a number of network configuration modules 102. Accordingly, the interconnections depict a flow of information from the learning pattern module 108 to the network configuration modules 102, even though communications between these modules may be bi-directional. Specifically, in this embodiment, the learning pattern module 108, or the pattern data and information generated thereby, is accessed by the feedforward networks module, the self organizing maps module, and the clustering networks module. Bi-directional communications may be established between the learning pattern module 108 and the feedforward network configuration module 102 (as shown) or, alternatively or additionally, any other configuration module 102.

A number of the support modules or configuration tools accessible via the main module 100 are shown in FIG. 2 as interconnected with the set of network configuration modules 102. Specifically, the help module 114, the random number generation module 120 and the activation functions customization module 122 may be accessed or relied upon via any one of the network configuration modules 102 to implement the functionality provided in support of configuration. For example, the random number generation module 120 may also be relied upon by support modules requiring or benefiting from the insertion of random data, such as the supervised training module 106 and the learning pattern module 108. More specifically, in some embodiments, the random number generation module 120 supports the customization or selection of the function or distribution utilized to generate random numbers. Alternatively, or additionally, the random number generation module 120 also supports the generation of the random numbers. In any case, and to these ends, the random number generation module 120 is accordingly shown is interconnected with the modules 106 and 108.

The learning pattern module 108 is shown as interconnected with the supervised training module 106 and the support vector machines module 112, inasmuch as these support modules may also rely on the pattern data established via the learning pattern module 108. In one embodiment, the interconnection shown in FIG. 2 may not necessarily be indicative of a way in which the learning pattern module 108 may be accessed, but rather indicative of the flow of data or information from one module to another. Nonetheless, in alternative embodiments, the learning pattern module 108 may be accessed via the support modules 106 and 112 in addition to the network configuration modules 102.

FIG. 2 shows that the help module 114 is interconnected with the suite of network configuration modules 102 as well as each of the support modules 106, 108, 110 and 112. These interconnections may be indicative of user implementation of the help module 114 to, for instance, address a question or concern raised during interaction with one of the display interfaces of the aforementioned support modules. In that event, the help module 114 may supply a display interface, window, panel or other interface elements to present data or information to assist the user in implementing the support module. Generally speaking, however, the help module 114 may be accessible from each display interface or window generated by any one of the modules or tools of the disclosed programming tool. In this way, the help module 114 may provide a framework or index to topics, help information, or other subject matter set forth in a help file or files that has been organized in any desired manner. Access to such information may therefore be made regardless of the current operational context of the disclosed programming tool.

Other than the connections to the help module 114, a number of the support modules may be accessed in a fashion independent from the network configuration modules 102 or other support modules. In this exemplary embodiment, the performance evaluation module 110 and the support vector machines module 112 are implemented via the main module 100. In alternative embodiments, however, these support modules may be linked, implemented, or otherwise accessed via one of the network configuration modules 102 or other support modules, as desired.

The interconnections between the modules and tools shown in FIG. 2 may, but need not, be indicative of concurrent operation of such modules and tools. Two or more modules or tools may, however, be concurrently implemented, in which case multiple display interface windows or interface elements be presented to the user. Generally speaking, the display interfaces and interface elements may be generated by the disclosed programming tool in accordance with standard graphical user interface procedures. For instance, a number of windows or other elements may be relegated to the background (or rendered dormant) as a result of the selection, activation or initiation of another window or element. Similarly, the display interface window(s) of one module may be minimized or otherwise positioned to allow other active windows or elements to be viewed.

As part of a graphical user interface utilizing multiple windows, the display interfaces generated by the modules and tools of the disclosed programming tool may be accessed or activated from other display interfaces. For example, implementation of the activation function customization module 122 may be initiated via selection of a command made available in one of the network configuration modules 102. As a result of that selection, a display interface window(s) may be generated by the activation function customization module 122, which then becomes the active window within the broader graphical user interface presented to the user. More specifically, the display interface window generated by the activation function customization module 122 may be presented as a top layer of multiple windows shown or depicted or rendered via the display device utilized by the graphical user interface. In some cases, the initiation of a display window, such as one generated by the activation function customization module 122, may require the user to interact or close the window prior to returning to the display interface from which it was accessed. In this way, the parameters, data or other settings to be established via the support module display interface are established prior to the initiation of functionality provided by the network configuration module 102 or other module utilizing the parameters or settings. For those support modules or configuration tools that may be accessed via the main module 100 or other module outside of the network configuration context, the data, parameters or other settings established by such support module or programming tool may be stored for later use by other modules provided by the disclosed programming tool. More specifically, one of the network configuration modules 102 need not be active or have a display interface window open for such data, parameters or other settings to be applied. As a result, the interconnection shown in FIG. 2 may be indicative of data exchanges or flows between active and non-active modules, in which case the data may be exchanged (or accessed) at a point in the future when the receiving module is activated or initiated.

Figure 3:
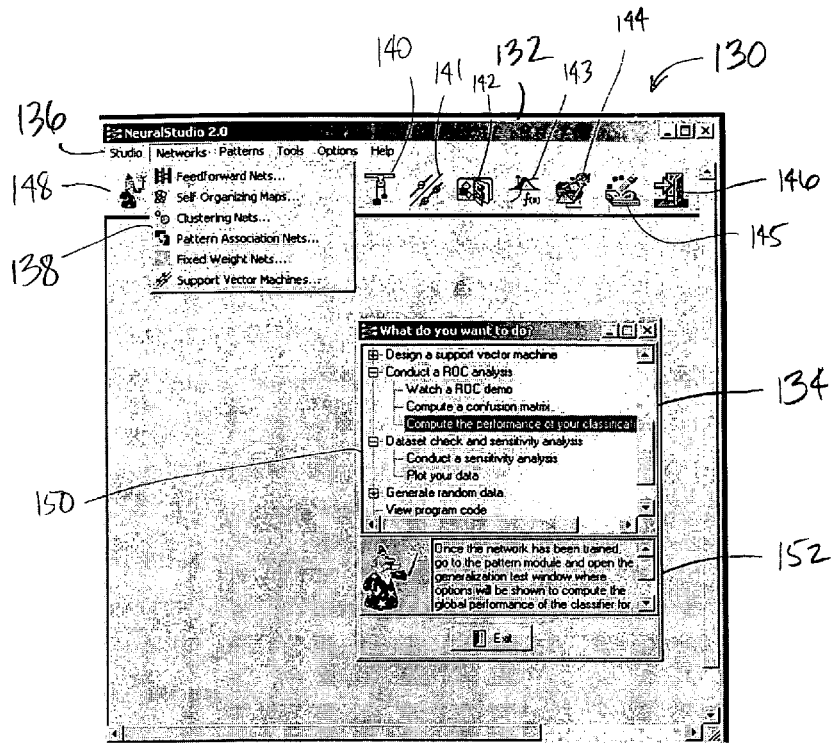
FIG. 3 is a simplified depiction of exemplary windows of a display interface generated by the main module of FIG. 1.

FIG. 3 shows a display interface indicated generally at 130 generated by the main module 100 and having a number of display interface windows or panels to generally provide access to the display interfaces and functionality provided by the other modules and configuration tools of the disclosed programming tool. In this exemplary embodiment, the display interface 130 includes a main window 132 and a help wizard window 134. The main window 132 is arranged as a conventional window in the sense that a menu bar 136 provides a set of drop-down command menus, such as a drop-down menu 138 for selection of a command by a user to initiate or implement other modules, tools or other aspects of the display interface. In this case, the drop-down menu 138 is associated with a Networks portion or element of the menu bar 136, such that the user may select from a set of network types provided in the drop-down menu 138 to initiate the implementation of the corresponding network configuration module 102. Specifically, in this embodiment, the user may select from feedforward networks, self organizing maps, clustering networks, pattern association networks, fixed weight networks, and support vector machines. In other embodiments, the set of available networks may contain more, less or different network types. The main window 132 may include one or more other mechanisms for presentation to the user to support selection of the aforementioned network types, such as a set of actuation icons or buttons set forth below the menu bar 136. Like the drop-down networks menu 138, the actuation icons may be selected by a user to initiate implementation of a network configuration module 102. For example, an actuation icon 140 may be directed to initiating the network configuration module 102 associated with fixed weight networks. Similarly, actuation icons 141-146 may be associated with the support vector machines module 112, the learning pattern module 108, the activation functions customization module 122, the performance evaluation module 110, the random number generation module 120, and an exit or program close option, respectively.

The help wizard window 134 generally provides a user with assistance with implementing various tasks via instructions and explanations related to such tasks. The help wizard window 134 may be generated as a result of user selection or initiation of a command made available via the menu bar 136 or an actuation icon 148 dedicated thereto. In either case, the help wizard window 134 includes a index panel 150 having a tree hierarchy from which a user may select a topic for viewing further information via a text panel 152 that is then directed to display the information for the selected topic. In this exemplary case, the help wizard 134 provides options to the user in the panel 150 to investigate tasks such as designing a support vector machine, conducting an ROC analysis, performing a data set check and sensitivity analysis, generation of random data, and viewing program code. As shown in FIG. 3, some of the topics available for selection include sub-topics made available in the conventional hierarchal manner in which a topic having a "plus" sign may be selected and expanded to reveal additional topics or topic layers of the hierarchy.

More generally, the main module 100 (FIG. 1) may generate a display interface having any form suitable for the initiation of implementation of the network configuration modules 102, the support modules, or the configuration tools, made available by the disclosed programming tool. For example, in one alternative embodiment, the main module 100 need not generate a separate, dedicated window, such as the main window 132, but rather set forth actuation icons similar to the actuation icons 140-146, in a command bar or menu tray made available within the broader graphical user interface in which the programming tool is implemented. Furthermore, the components of the display interface 130 need not be integrated as shown in FIG. 3, insofar as the functionality provided by the help module 114 (FIG. 1) need not be provided as a window therein. In fact, the exemplary embodiment shown in FIG. 3 provides an option to disable the help wizard window 134 via a toggle command available via the menu bar 136 under the Studio component thereof. The Studio component of the menu bar 136 may also provide general functionality for the disclosed programming tool, such as an exit or close option. Other components of the menu bar 136 may provide access to, for instance, the learning pattern module 108 and the other support modules and configuration tools via the menu bar elements such as Patterns, Tools, Options and any other menu bar elements as desired. Specifically, in this exemplary case, the Tools element of the menu bar 136 may generate a drop-down menu (not shown) having or presenting a list for implementing the activation function customization module 122, the performance evaluation module 110, the random number generation module 120, and the network averaging module 118 as optional selections. Selection of one of the options by the user generally initiates the implementation of the corresponding support module or configuration tool. The Options element of the menu bar 136 may provide access to the code insight module 116, as well as other application-wide options such as a number format specification module or tool. Other options or tools may be made available via these elements of the menu bar 136, as desired.

Figure 4:
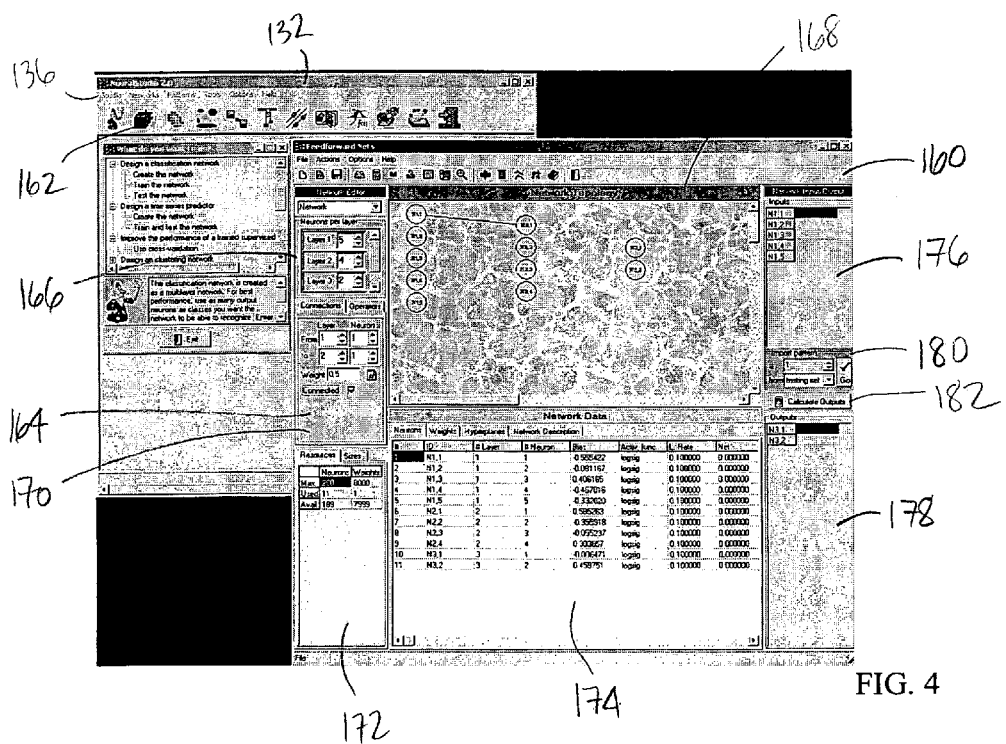
FIG. 4 is a simplified depiction of an exemplary network configuration window of a display interface generated by the network configuration module and accessed from the main module of FIG. 1.

With reference now to FIG. 4, an exemplary embodiment of the disclosed programming tool is shown as having generated a further display interface window 160 in connection with the network configuration module 102 associated with feedforward networks. More specifically, a user may have initiated the implementation of the network configuration module 102 by selecting an actuation icon 162 below the menu bar 136 of the main window 132. In this embodiment, the display interface window 160 constitutes a separate window from the windows 132 and 134 generated by the main module 100. In alternative embodiments, the display interface windows or other graphical user interface elements generated by the network configuration module 102 for configuring feedforward networks (or any other network type) may be integrated, or made a part of, the main window 132. More generally, the disclosed programming tool is not limited to any particular arrangement of display interface windows or graphical user interface elements. In the exemplary embodiment shown, however, the display interface window 160 provides an interface dedicated to the configuration of a feedforward network. Accordingly, if the user wishes to also begin the configuration of another network, the window 160 (and any other windows) may be minimized, repositioned or otherwise organized to facilitate the network configuration.

The display interface window 160 generated by the network configuration module 102 generally includes a number of panels of sections directed to different configuration functionality, network configuration data, or network configuration information. A network editor panel 164 generally provides an interface for user selection of the number of neurons per layer and any connections between neurons, as well as the weights, biases, learning rates, and activation functions associated therewith. More specifically, in a first portion 166 of the panel 164, the user is provided with an option to select a number of neurons per layer by using scroll keys associated with each layer to toggle the number of neurons up or down. Alternatively, the user may enter the number of neurons in a data input field directly. The section 166 further includes a scroll bar as shown for access to the layers beyond those currently shown, such that scrolling down may reveal the fourth and fifth layers, etc. Furthermore, with the identification of at least one neuron in a layer, the network editor panel 164 automatically creates another data input field in the section 166 as a placeholder for the optional configuration of the next consecutive layer. In the example shown in FIG. 4, five neurons have been identified for the first layer, four neurons have been identified for the second layer, and two neurons have been identified for the third layer.

With the identification of each layer, graphical representations of the neurons are depicted in a network topology panel 168 that generally forms a pallet for graphical configuration of the network topology or structure. The network topology panel 168 generally provides the user with an interface to graphically configure the network topology. For example, and as shown in FIG. 4, a connection has been established between neurons N1,1 and N2,1. A user may then employ the mouse pointer to connect the neurons by clicking on one neuron and dragging the mouse pointer toward another neuron. A form of "drag-and-drop" operation then forms the connection. Neurons may alternatively or additionally be automatically connected in bulk fashion via a section 170 of the network editor panel 164, which provides an operators tab to reveal and "Execute Operator" option (via a button or the like). Implementing this option adds new connections to the network topology in every possible feedforward configuration. Moreover, the Execute Operator option may be configured to erase all prior connections made, together with any values associated with the neurons or connections. In alternative embodiments, the Execute Operator option may be configured not to disturb such prior connections or other configurations. In either case, the Execute Operator option may be customized via a drop-down menu to specify (i) whether full (i.e., all possible) connections will be made, (ii) whether only weights will be specified, (iii) whether only biases will be specified, and, (iv) whether only learning rates or activation functions will be specified. More generally, the Execute Operator option made available via the section 170 provides a convenient mechanism for establishing a large number of initial values for the weights, biases, etc. In contrast, a connections tab of the section 170, however, provides a more selective approach to specifying such parameters, insofar as the weight values may be specified on a connection-by-connection basis via an input panel of the section 170 or via selection of a random number generator icon or button made available in the section 170.

The configuration display interface window 160 for configuring feedforward networks further includes a panel 172 for providing resource and size information for the neural network being configured. More specifically, a resources tab may be selected to reveal a table showing information directed to maximum, used, and available resources for support of the configuration. Selection of a sizes tab within the panel 172 provides user customizable parameters for the network topology panel 168. For example, the size of the neurons (e.g., radius), the horizontal separation of the layers, the vertical separation of the neurons (center to center distance), and overall margins may be set via respective input data fields.

The configuration display interface window 160 further includes a panel 174 for displaying network data in a tabular format with a number of tabs for selecting tables dedicated to different aspects of the configuration, namely neurons, weights, hyperplanes and network description. As shown in FIG. 4, selection of the neurons tab by the user causes each neuron to be identified along with bias, activation function, learning rate and other information relevant to each neuron. In some cases, the network data panel 174 may reveal the current output of the neuron and such data as net, inner activation, slope of the activation function, etc. Further information regarding the network data panel 174 is set forth below in connection with FIGS. 5-7.

The configuration display interface window 160 further includes panels 176 and 178 dedicated to presenting input and output data for the network being configured, respectively. More specifically, the panel 176 allows a user to select a cell next to an identification of a neuron, such as N1,1, to enter an input data value directly into the cell. Furthermore, the panel 176 may present data to be used as a part of a training data set or testing data set that has been imported via a section 180 of the panel 176. Still further, selection of a button 182 allows the user to calculate outputs based on the given training or testing data set. The resulting output data may then be displayed in the panel 178 by cells arranged in accordance with the output neurons specified in the network topology panel 168.

Generally speaking, the aforementioned panels of the configuration display interface 160 support configuration of the artificial neural network being configured, which in this case is a feedforward network having a user-customizable topology or structure along with user-selectable neuron, connection and other parameters. The panels of the display interface window 160 provide such functionality in a user-friendly, convenient manner via graphical user interface tools and selection mechanisms. The user is thus enabled to quickly configure and set up a feedforward network without having to use script or other programming language commands to define the layers, connections and other network details. As described below, the disclosed programming tool additionally provides functionality for facilitating the further configuration or customization steps (e.g., customizing the activation functions), as well as the management and analysis of the training and testing pattern data sets.

Figure 5:
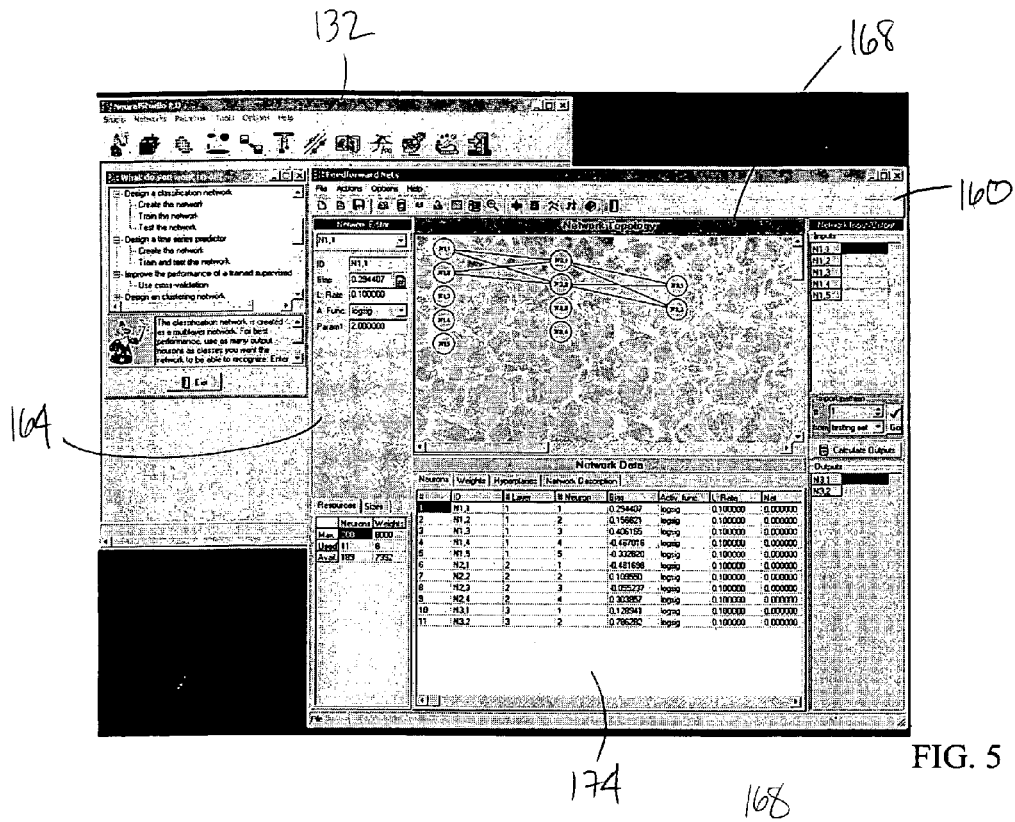
FIG. 5 is another simplified depiction of the exemplary network configuration window of FIG. 4 after implementation of several configuration steps supported by the network configuration module and showing a network editor panel and network configuration table thereof in respective modes to effectuate neuron configuration.

Turning now to FIG. 5, the network topology panel 168 of the display interface window 160 is shown after further configuration steps taken by a user to establish neuron connections. At the point shown, the user may have selected a particular neuron, such as neuron N1,1, via the mouse pointer or other graphical user interface selection mechanism, to reveal configuration details regarding the neuron or to facilitate the configuration thereof. To that end, the network editor panel 164 is modified from the view shown in FIG. 4, which is generally directed to the display of information at a network level, to instead display information regarding the selected neuron. In this exemplary embodiment, the panel 164 reveals a number of input data boxes for user specification of the neuron bias, learning rate, activation function, and one or more parameters for the activation function. The bias value may be entered directly by the user or set via selection of a random number generator button shown adjacent thereto. The activation function may be selected from a drop-down menu made available in connection with the corresponding input field. Updates to the neuron parameters via the panel 164 may then be revealed in the network data panel 174 prior to selection of a different neuron for configuration. To return to the network level view (or version) of the editor panel 164, the user may point and click the mouse pointer button at a portion of the network topology panel 168 not having a neuron or connection.

Figure 6:
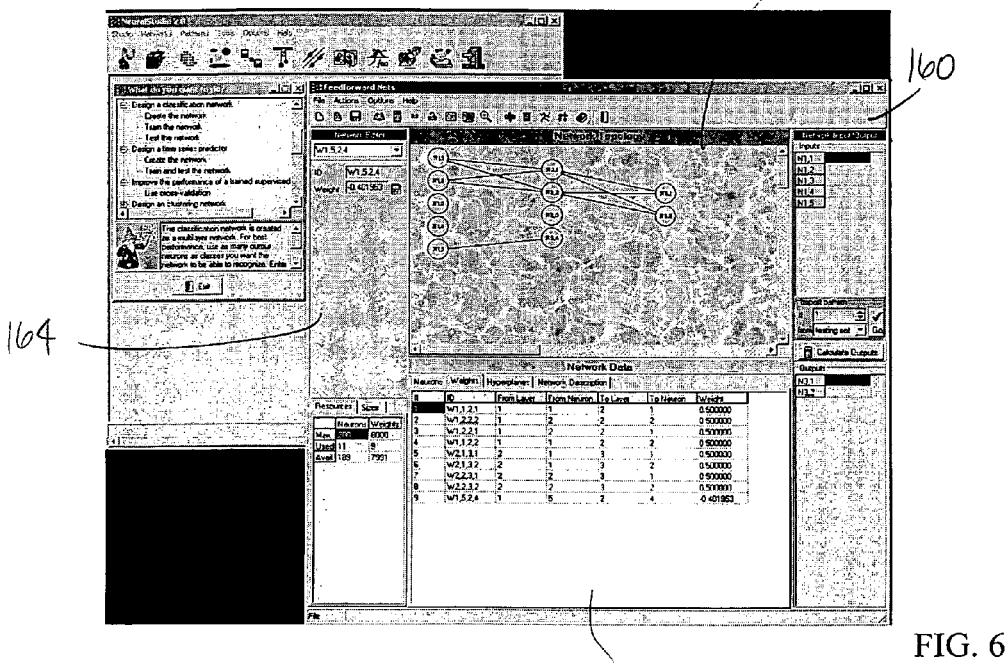
FIG. 6 is yet another simplified depiction of the exemplary network configuration window of FIGS. 4 and 5 after a further configuration step that adds a neuron connection supported by the network configuration module and showing the network editor panel and network configuration table in respective modes to effectuate connection weight configuration.

FIG. 6 shows a further version of the network editor panel 164 of the display interface window 160 after a user has selected a neuron connection for configuration. The user may have selected the connection by a point-and-click operation at the portion of network topology panel 168 having the connection line. Details regarding the selected connection are then revealed. Alternatively, a drop-down menu may provide connections for selection. In the example shown, the connection between neurons N1,5 and N2,4 is identified in a data display field as W1,5,2,4 below which data input fields are provided for the configuration. As with the neuron configuration, a random number generator button is provided adjacent to the data display field for use as desired. As the neuron connections are established in the network topology panel 168, and the weights are specified via the panel 164, the network data panel 174 may display the parameter data, such as the connection weights, as they are established.

Figure 7:
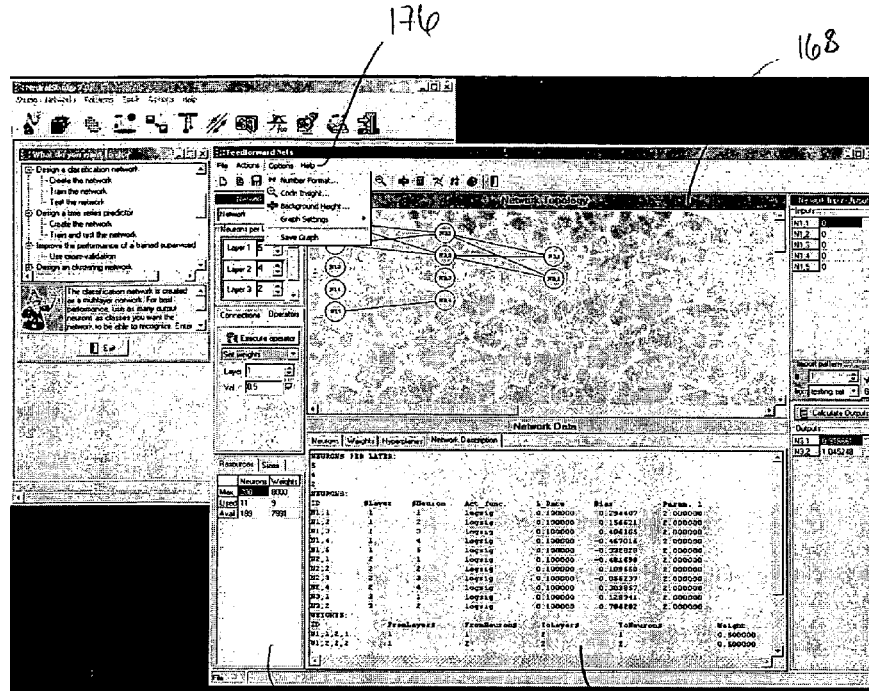
FIG. 7 is another simplified depiction of the exemplary network configuration window of FIGS. 4-6 showing the network configuration table in a network status description mode.

With reference now to FIG. 7, the network data panel 174 of the display interface window 160 is shown after user selection of a network description tab, which resulted in the display of network parameter and other information, such as the number of neurons per layer, neuron information similar to that shown under the neurons tab of the panel 174, connection weight information, and other information relevant to the network configuration. In some embodiments, such network description information may be presented in conjunction with other types of representations of the network information that, for instance, do not set forth network data in a tabular format. For instance, the panel 174 may present a Hyperplanes tab as shown in FIG. 7 to provide a decision function tool that presents a graphical representation of discriminant planes of the feedforward network being configured. As is known to those skilled in the art, such discriminant planes, or decision lines, provide a representation of the network by a linear or discriminant equation for classification of data points with respect to the line or plane. To that end, the selection of the hyperplanes tab in the panel 174 may provide options or settings directed to a number of discriminants for a layer of the network, as well as for identification of the reference neurons for the hyperplanes equations. The user may then specify the reference neurons for plotting the data input patterns. Once the foregoing settings are established, the data may be plotted in a customizable graph within the panel 174. In this manner, the hyperplanes provide for classification or class separation and facilitate a visualization of the regions created by the network being configured after, for instance, a training iteration.

In some cases, the network configuration parameters and data resulting from the configuration and design work enabled by the disclosed programming tool may be stored as a text or similar file in an order or structure as that shown via the panel 174 after selection of the Network Description tab. Alternative embodiments may store the configuration data in a compressed or other format, as desired.

With continued reference to FIG. 7, the display interface window 160 includes a command menu bar 176 having an options pull down menu that presents a number of support modules or configuration tools available for use in connection with a configuration of the feedforward network. For instance, in this embodiment, the options available for customization by the user include a number formatting option, a background height option, and a series or set of graphs settings options to specify background colors or styles, as well as graphical item sizes. These settings may be similar or related to the graphical settings made available to the user for customization via the panel 172 of the display interface window 160. The options pull down menu may also provide a mechanism for initiating implementation of the code insight module 116 (FIG. 1) in which case a separate display interface window may be generated to display code related to, for instance, the back propagation training algorithm associated with the feedforward network being configured. Lastly, the options pull down menu may provide a mechanism for saving one or more of the settings specified by the user, such as saving the graph itself set forth in the network topology panel 168.

The other pull down menus made available in the command menu bar 176 of the display interface window 160 may provide general graphical user interface commands, such as creating a new network file, opening a previously configured network file, saving the current network being configured, and closing or exiting the display interface window 160. Under the actions pull down menu of the command menu bar 176, the user may initiate a calculation of network outputs given the current configuration, initiate a supervised training of the network, or implement a codify and save command for storing network configuration information in a codified format.

Figure 8:
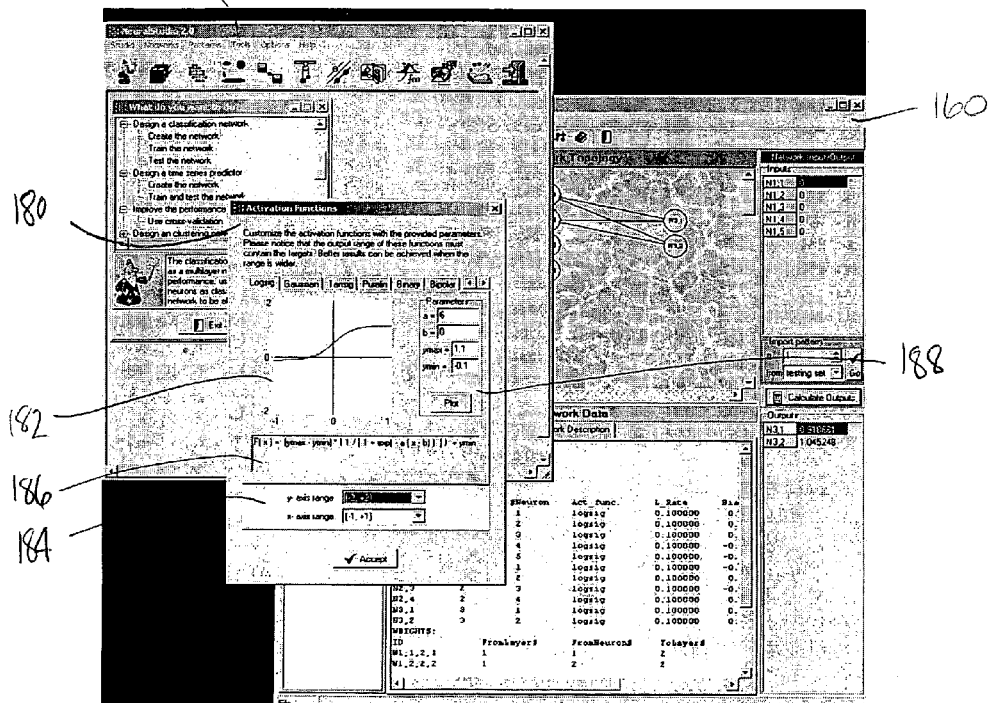
FIG. 8 is a simplified depiction of an exemplary window providing a network configuration tool in support of specification of a customized activation function for use in the configuration and training of the artificial neural network.

With reference now to FIG. 8, an exemplary embodiment of the disclosed programming tool is shown in connection with the implementation of the activation functions customization module 122, (FIG. 1) via the main display interface window 132. In some embodiments, the implementation of the activation function customization module 122 may be initiated from a display interface window associated with a different module, such as the network configuration module 102 associated with feedforward networks and, particularly, the display interface window 160. In either case, implementation of the activation function customization module 122 results in the generation of a display interface window 180 that appears as the current, or active, window for the user. Generally speaking, the display interface 180 provides an opportunity to the user to establish one or more parameters for each type of activation function available for use in connection with network configuration. A number of different activation function types may be made available including without limitation the log sigmoid transfer function, a Gaussian transfer function, a hyperbolic tangent sigmoid transfer function, a linear transfer function, a binary function, a bipolar function, a normalized linear transfer function, and a trivalent transfer function. These activation function types may be set forth as tabs horizontally arranged above one or more sections or panels of the window 180 directed to displaying information and parameter selections for the current selected activation function type. In the event the window 180 has a size and sufficient to display all of the tabs for each activation function type, scroll arrows may be provided. Alternatively, and in any case, the window 180 may be configured with a drop-down or other menu structure to facilitate the customization of the activation function types.

In the example shown in FIG. 8, the tab associated with the log sigmoidal transfer function is selected such that a plot or graph section 182 of the window 180 displays a plot of the function as it is currently configured over an X-axis range and Y-axis range selected by the user in a section 184 of the window 180. To that end, the section 184 may include a pair of input data fields corresponding with the X-axis range and the Y-axis range to support the modification thereof via dropdown boxes or other graphical user interface selection mechanisms. Between the sections 182 and 184, the window 180 includes a section 186 directed to displaying the current activation function in equation form, thereby identifying a number of parameters for customization by the user. For example, the log sigmoidal transfer function utilizes parameters A, B, Y max and Y min. To support the customization of such parameters, the window 180 further includes a parameter customization section or panel 188 having a corresponding number of input data fields for the parameters of the activation function being customized. After entry of data values in the fields of the panel 188, the user may select a plot button or other command to reveal how changes to the parameters effect the plot in the section 182. Alternatively, the activation function customization module 122 (FIG. 1) may be configured to automatically update the plot upon changes to the parameters.

The display interface window 180 provides a convenient way for users to visualize the potential activation functions available for use in connection with the network being configured, while setting initial values for each of the parameters of the customization function. In some embodiments, one or more of the parameters of an activation function selected for use in a network may be optimized during training, as described below in greater detail. For instance, a slope parameter of the log sigmoidal and Gaussian functions may be optimized via the back propagation algorithm for training a feedforward network configured via the display interface window 160 described above.

Figure 9:
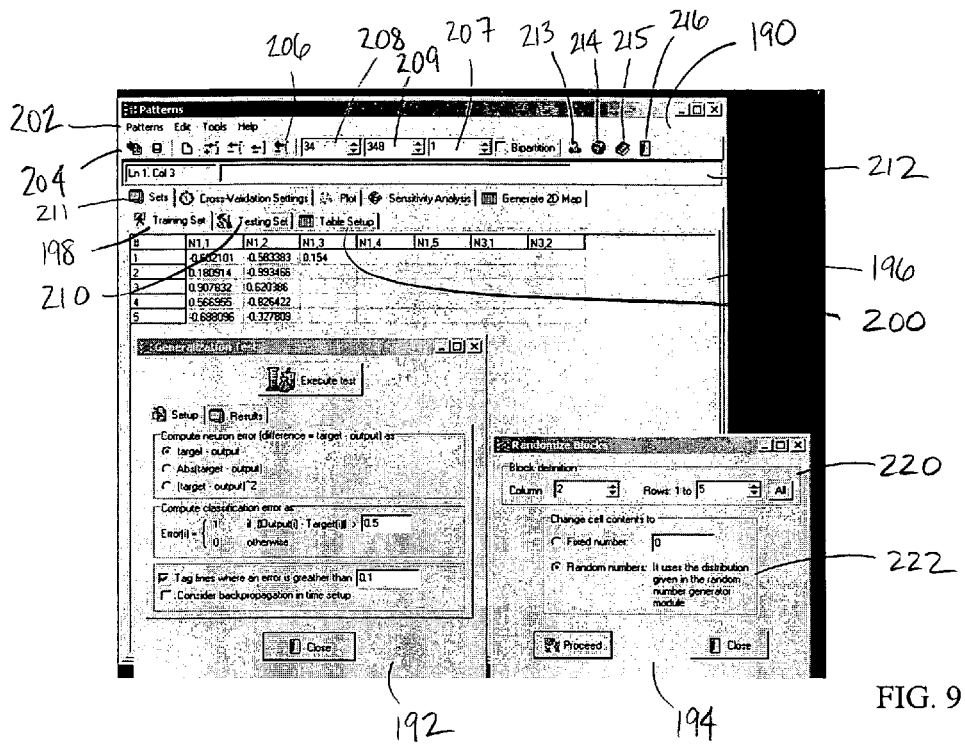
FIG. 9 is a simplified depiction of exemplary windows of a display interface generated by the learning patterns module of FIG. 1 to support establishment of pattern data sets for training and testing the artificial neural network, and to support implementation of a generalization test of the artificial neural network using one of the pattern data sets.

Turning to FIG. 9, the manner in which the learning pattern module 108 (FIG. 1) provides one or more interfaces to support the establishment and modification of training and testing pattern data sets is now described in connection with an exemplary embodiment having a main display interface window 190 from which a number of additional windows, panels or other user interface elements may be generated. The display interface window 190 may be generated as a result of selection of a command made available in the main window 132 or, additionally or alternatively, via any other command made available via one of the network configuration modules 102 (FIG. 1). In any event, upon initial implementation of the learning pattern module 108, the display interface window 190 may be the only interface made available to the user. Nonetheless, for ease and illustration, FIG. 9 depicts the display interface window 190 as the current active window, but together with two additional windows generated via the functionality provided by the learning pattern module 108, namely a generalization test window 192 and a block randomization window 194.

In the exemplary embodiment shown in FIG. 9, the display interface window 190 includes a number of tabs in support of multiple aspects of pattern data management. More specifically, the display interface window 190 includes a panel or section 196 in which tables of pattern data may be displayed not only for viewing such data, but also for entry and modification thereof. To manage the pattern data set for training, the display interface window 190 includes a training set tab 198, the selection of which generates a table dedicated to the training pattern data set in the panel 196. The training pattern data may be arranged in rows as shown, and with the columns dedicated to the input values for the neurons or other network elements associated with input variables. In this case, the table set forth in the panel 196 is configured in accordance with, for instance, a feedforward network configured via the display interface window 160 described above in which five neurons are located in an input layer. Similarly, the number of columns dedicated to output data values for the training and pattern data set is established by the number of neurons in the output layer of the network configured via the display interface window 160. A tab 200 may be selected to reveal a panel having a number of options for the user, including an option to set up the table according to the multilayer network design, or another option to set up the table as desired in a free design. Once the table is created, the user may enter input and output values manual via selecting a cell within the table using the mouse pointer or other control mechanism. Alternatively or additionally, pattern data or data set(s) may be entered by importing data from a file via a command set forth in a drop-down menu from a menu bar 202 or an icon dedicated thereto in a command bar 204. In either case, the imported pattern data or data set(s) may be appended to those patterns already present in the table set forth in the panel 196. The commands made available via the menu bar 202 and the command bar 204 generally enable a user to manage the pattern data set(s) by adding one or more patterns, deleting one or more patterns and saving the pattern data set. In the exemplary case shown in FIG. 9, an icon 206 is included the command bar 204 to delete a number of rows (i.e., patterns) specified in an input data field 207, with the location of the rows to be deleted specified via additional input data fields 208 and 209. Alternatively, or additionally, patterns or rows of the table may be deleted via command key strokes or any other desired interface mechanism.

As described above, the learning pattern module 108 (FIG. 1) also provides the capability of establishing a pattern data set for testing the artificial neural network being configured or trained. To that end, the user may select a tab 210 for the generation of a table in the panel 196 similar to that shown in connection with the training data set. In fact, the support in handling of the pattern data sets for training and testing may be identical, thereby providing the user with flexible data management for both training and testing. Alternatively, or additionally, the testing pattern data set may be identified as a subset of the training pattern data set. Similarly, the converse is also true, in the sense that the testing pattern data set or any portion thereof, may be used in connection with training the network. Further details regarding these types of data management functions are provided below, but general graphical user interface functionality may also be used to effectuate such pattern data sharing. For example, the table set forth for the training and testing pattern data sets in the panel 196 may be cut, copied, and pasted via conventional commands to move, duplicate or otherwise manage one or more patterns, one or more cells, or one or more values of the table. In this way, as well as for the reasons set forth above, each of the tables made available via selection of the tabs 198 and 210 may be considered to be editable tables that support both viewing, entering, and modification of the pattern data sets. Furthermore, the use of the editable tables is not limited to establishing pattern data sets directed to a preexisting or preconfigured network. Instead of using the automatic table setup routine made available via the tab 200, a user may create tables having a customized structure (i.e., the number of rows and columns).

The display interface window 190 may be configured such that two layers of tabs arrange the functionality provided by the learning pattern module 108 (FIG. 1). As shown in the exemplary embodiment of FIG. 9, a sets tab 211 may be selected to provide the opportunity to generate one of the editable tables via the tabs 198 and 210. In addition to the second row of tabs, the display interface window 190 may further include a data entry line or panel 212 that includes one field to identify the current cell of one of the editable tables and another field for entry of a current value for that cell. Above the data entry line 212, the display interface window 190 may still further include a number of actuation icons for initiating the implementation of one or more support modules or programming tools. More specifically, an icon 213 may initiate implementation of the random number generation module 120 (FIG. 1), while icons 214 and 215 may initiate implementation of a generalization test module or sub-module (to be described below) and the help module 114 (FIG. 1). Lastly, an icon 216 may be provided to exit or close the learning pattern module 108.

The display interface window 190 may also include an option for implementing a bi-partitioning or other partitioning for two or more classes of one of the pattern data sets. In this way, pattern data sets having a less repeated class may be separated such that training may easily alternate between patterns from the different classes and the patterns from the lower number of training elements may be repeated in a loop, as necessary. A user may also utilize this option to establish or modify the class (or target) value of contiguous portions of, for example, the training data pattern set.

With continued reference to FIG. 9, selection of the icon 214 or a corresponding command from, for instance, the tools drop-down menu of the menu bar 202 may result in the generation of the generalization test window 192. The functionality provided via the window 192 may be organized within the disclosed programming tool as a separate module or sub-module of the learning patterns module 108. Alternatively, such functionality may be entirely or partially integrated within the learning patterns module 108, as desired. In either case, the window 192 generally provides for an initial setup of parameters for the generalization testing, execution of the generalization testing and a display of test results. In the embodiment shown in FIG. 9, the foregoing functionality is provided via a pair of tabbed pages or panels directed to setup and results, respectively. The setup page may provide options to be selected by the user directed to in the manner in which neuron error is computed, the manner in which classification error is computed, the error threshold for tagging lines, and whether to consider backpropagation in connection with the testing. The results page may provide a grid or table or cells identifying output neuron errors as well as summary panels or sections directed to identifying minimum, average and maximum errors across all output neurons, as well as classification error accounts of errors and patterns and a classification error ratio or percentage. More generally, the window 192 and the generalization test functionality may be applied to either the training pattern data set or the testing pattern data set or any portion or combination thereof. In these ways, the learning pattern module 108 (FIG. 1) is capable of computing classification error for the network being configured, simulated or tested. In one embodiment, the patterns used for generalization testing are the ones whose table is visible at the front of the display interface window at the time of test execution.

The window 194 may be useful for quickly entering, in block or bulk fashion, a number of data values within the training and testing pattern data sets. On one hand, the window 194 may facilitate the randomization of one or more data values within a selected portion of the pattern data table for either the training or testing pattern data sets. One the other hand, the user may insert a fixed number within the selected portion. To facilitate such multiple entries, or block(s), of such values, the window 194 has a section or panel 220 to an identification of one or more column numbers and row numbers. The panel 220 further includes an "all" button, the actuation of which randomizes all cells within the current table of pattern data.

Another section or panel 222 of the window 194 is directed to specifying whether the selected block of cells is to be changed to either a fixed number or a random number. Selection of the latter option then relies on a random number generator tool based on a random number distribution function specified in the random number generation module 120, which may be accessed for customization via the main window 132 generated by the main module 100 (as described above in connection with FIGS. 1 and 3). Alternatively, the window 194 or, more generally, the display interface window 190, provides an option to implement the random number generation module 120 for such specification. In some embodiments, the window 194 is generated by a set of instructions or routines not integrated with the random number generation module 120. Execution of these instructions or routines may then generate one or more display interfaces for selecting the random number distribution function. In such cases, the instructions or routines responsible for generating the window 194 may, but need not, be integrated with the learning pattern module 108.

Figure 10:
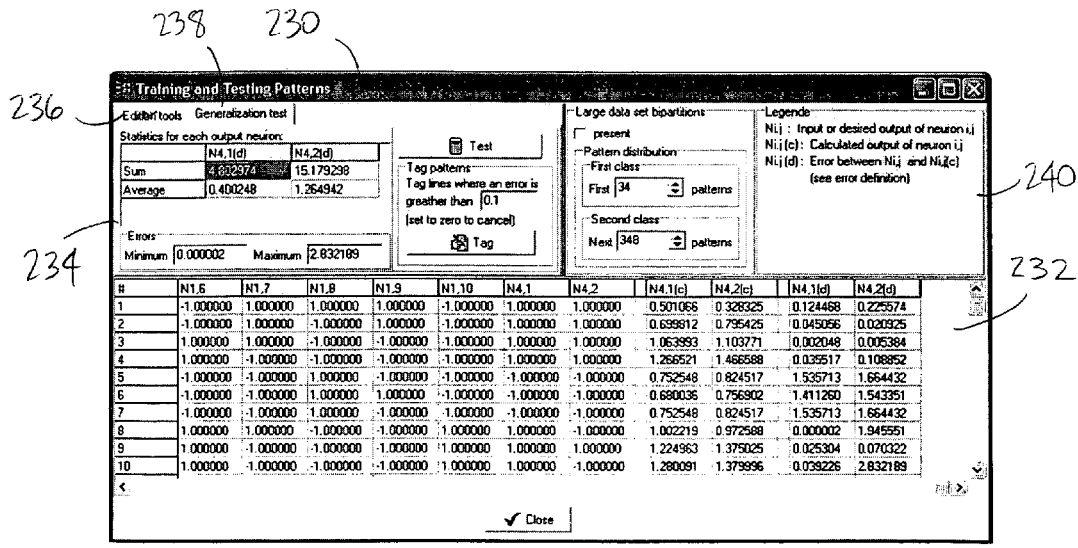
FIG. 10 is another simplified depiction of the exemplary window of FIG. 10 showing results of the generalization test of the artificial neural network.

FIG. 10 shows a display interface window 230 generated by the learning pattern module 108 (FIG. 1) in accordance with an alternative embodiment. The display interface window 230 generally integrates the functionality provided by the display windows 190 and 192 into a single window having separate sections or panels dedicated to editing one or more pattern data sets, managing one or more pattern data sets and performing generalization testing. In this embodiment, the results of generalization testing may be shown in a table section 232 of the display interface window 230, such that both input pattern data and neuron output data are made available to the user. Prior to such testing, a section or panel 234 may be used to customize the testing, initiate the testing or otherwise control the testing in the manner described above in connection with FIG. 9. Furthermore, the panel 234 may provide statistics for each output neuron and error data summaries or statistics on a network wide basis, as described above. The panel 234 may also provide tools for editing and otherwise managing the pattern data via selection of an editor tool tab 236, while a tab 238 is selected to generate the generalization test version or page of the panel 234. A panel 240 may correspond with the functionality described above in the embodiment of FIG. 9 in connection with establishing data set bi-partitions and pattern distribution classes.

As shown in connection with the embodiments of FIGS. 9 and 10, the manner in which the learning pattern module 108 (FIG. 1) integrates or separates various functionality for establishing, modifying and otherwise managing the pattern data with or without generalization testing may vary in accordance with design preference. In any event, the generalization test functionality may, but need not, be automatically associated with the testing pattern data set or whatever set or set portion is currently selected by the user. Such selection may occur via highlighting one or more rows of a set displayed in the display interface window or table. The selection of different portions of the pattern data set(s) may be useful in connection with performance evaluation, as is described below in connection with the performance evaluation module 110 (FIG. 1). To that end, the learning pattern module 108 and the display interface windows generated thereby, may provide the capability for saving generalization test results for later use.

Further information regarding the functionality of the learning pattern module 108 is set forth below in connection with FIGS. 18-22. Set forth below first, however, is a description of the use of the training pattern data set(s) created and managed by the learning pattern module 108. Generally speaking, the training pattern data set(s) may be used in either supervised or unsupervised training of a number of different networks and network types, depending on the nature of the data (e.g., whether target data is included therein). When the patterns include target data, the supervised training module 106 (FIG. 1) may be implemented to utilize the training pattern data sets in connection with feedforward networks. Generally speaking, the feedforward network may be trained in accordance with approximation and classification options. The former option uses the training set to approximate the relation of an input to a target given in the training set. Alternatively, the user may elect to approximate a mathematical function, which may be personalized or customized by the user via selectable parameters thereof. In this case, the training set is constructed internally rather than via the learning patterns module 108. The classification option allows the user to create hyperplanes for the class separation and facilitates a visual output of the regions after each iteration. In any case, implementation of the supervised training module 106 may be initiated via a command available in the display interface window 160 generated by the network configuration module 102 associated with feedforward networks.

Figure 11:
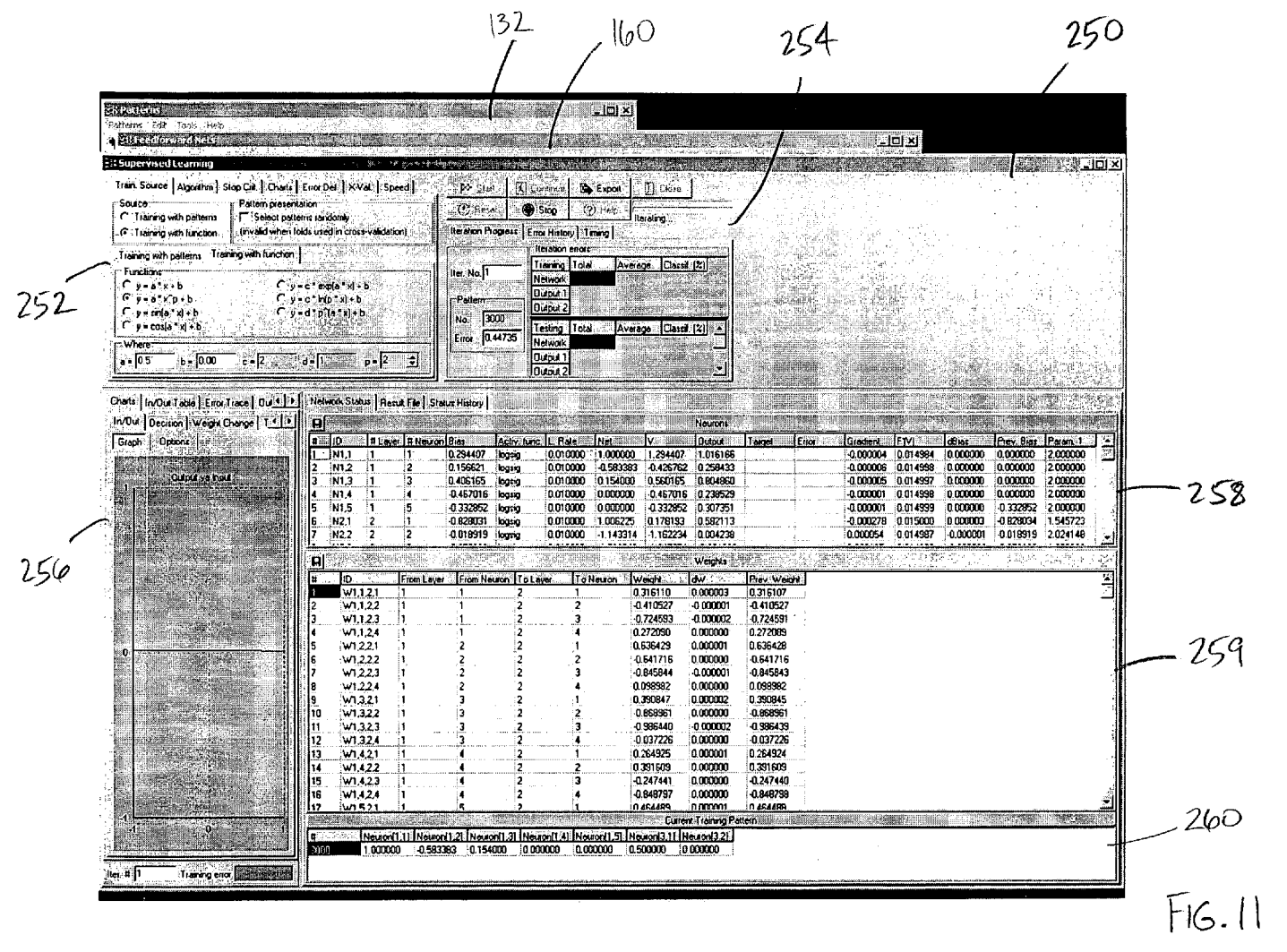

As shown in FIG. 11, the supervised training module 106 may generate a display interface window 250 to control the training based on the training pattern data set(s). To this end, the supervised training module 106 utilizes the current network being configured via the display interface window 160 as well as the training pattern data set currently made available by the learning pattern module 108. As a result, the supervised training module 106 (and, thus, the display interface window 250 and its functionality) may be integrated to any desired extent with the network configuration module 102 (and its display interface window 160), and need not constitute a separate support module for the training of feedforward networks. Either way, in this embodiment, the display interface window 250 includes a training options panel 252, a training control panel 254, a training status plot panel 256 and a number of training status panels 258-260. Each of the aforementioned panels of the display interface window 250 may have a number of tabbed pages associated therewith, as described below in connection with FIGS. 12-17. Generally speaking, however, a number of the panels or panel pages may provide information dynamically such that they continue to be updated during a training procedure, particularly those panels or panel pages providing status information for the training session. While the continuous updates to the training session are indicative of an ongoing training procedure, it may be rather difficult to follow changes in any network parameters or other data displayed via the window 250. For that reason, as well as others, the panel 254 provides a button to support a pause or cessation of training iterations. Upon pausing the training, those panels or panel pages of the window 250 displaying training status information then reveal a snapshot of the training procedure. In this way, the supervised training module 106 provides a convenient teaching tool for users learning aspects of the process. For example, the panel 258 may show the current neuron biases and activation function parameters that are being optimized as a result of the training. Similarly, the panel 259 may present the connection weights as they currently stand as a result of the training. Lastly, the panel 260 may present information indicative of the current training pattern at the point at which training was paused.

The pause in training may also provide an opportunity for the user to observe iteration error, classification error, and other network wide data set forth in the panel 254 and, more specifically, an iteration progress page thereof. In addition to the iteration progress tab page, the panel 254 may provide an error history and timing tabs for display of additional information regarding the training process and status of the network via the panel 254. The pause in training may also provide an opportunity to save or record the current configuration (or version) of the network, which may be used later to form an average network (as described below).

The panel 256 of the display interface window 250 is generally directed to providing a graphical indication of the status of the neural network being trained. To that end, the panel 256 has a number of different graphs available for viewing in accordance with a selected tab thereof. For example, the panel 256 may display an input/output graph, a decision boundary graph (or decision lines chart), a weight change or weight evolution graph, or a total error (training and testing) graph. As with other panels or panel pages described herein above, scrolling arrows may be provided within the panel 256 to reveal further tabs for selection. The panel 256 may also include a set of tabs in addition to the aforementioned chart tabs for configuring or specifying aspects of the data to be displayed via the graphs. For instance, an input/output table tab may lead to the display of input and output data values to be plotted in the graph or chart. Error trace and output error parameters may also be specified via respective tabs.

The network status panels 258-260 may be displayed via selection of a network status tab. The display interface window may further include a result file tab and a status history tab. The result file tab may provide the user with an option to update a display of training results, as well as an option to export the results to a file for storage. The status history tab may provide the user with another option to save the connection weights, neuron biases, and other network configuration data determined by the training to, for example, a file In some cases, such network configuration data may be stored in a file in a columnar format to facilitate comparisons of the state of the network throughout the training process. Then, the status history tab may also provide an option to view a table showing the sequence of neuron bias data or other network parameters for comparison. The table may also include a column for averaging the network parameters, as well as an option to export such averages to another display interface window, such as the window 160 (FIG. 4).

FIGS. 12-17 present the panel or section 252 of the display interface window 250 in greater detail and in accordance with an exemplary embodiment. Although shown in FIGS. 12-17 separately from the rest of the display interface window 250, the panel 252 may be integrated to any desired extent with the rest of the contents of the window 250 or, for that matter, one of the other display interface windows related to the configuration of a feedforward network. As described below, the panel 252 may include a number of tabbed pages for specifying training options to customize the training process, although such options need not be arranged as tabbed pages or as otherwise shown or described herein.

Figure 12:
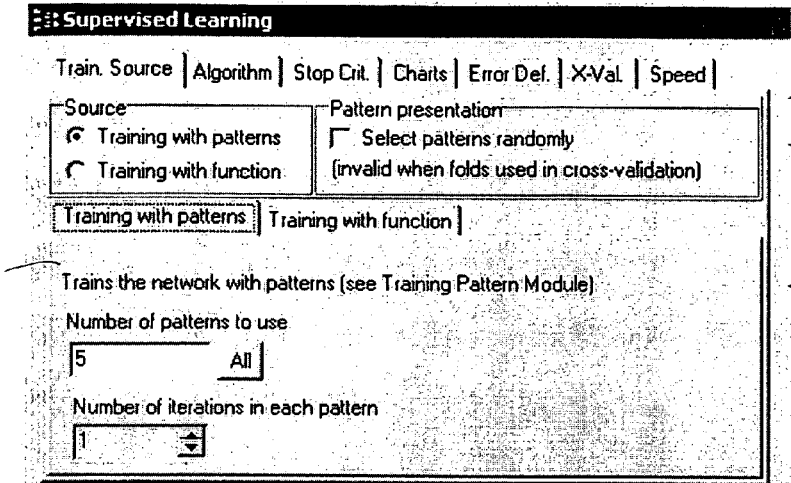
FIGS. 12-17 are simplified depictions of exemplary windows of the display interface of FIG. 11 generated by the network configuration module to support selection of a number of options for implementation of the supervised learning tool.

Turning to FIG. 12, the panel 252 includes a tabbed page 262 displayed as a result of the selection of a training source tab. The page 262 generally allows a user to specify whether training will occur with pattern data (or one or more data sets) or to approximate a function. In the former case, a user may select an option that directs the supervised training module 106 (FIG. 1) to select patterns randomly within a set. As noted, however, in the exemplary embodiment shown in FIG. 12, the random presentation of patterns for supervised learning may not be available and certain circumstances, such as when folds are used in cross validation. Training with patterns may be selected via a tab dedicated thereto or a corresponding checkbox. In either case, the page 262 allows the user to specify a portion of the set, i.e., the number of patterns for use, and a number of iterations in each pattern, i.e., the number of times each pattern will be presented to the network during the training process. In this way, the user may analyze how replicating patterns affects the network convergence. Selection of the option of training to approximate a function via a corresponding tab or checkbox may reveal a number of functions (e.g., a parabola) from which to choose via selection boxes, together with data input fields or boxes to specify parameters of the function. In one embodiment, seven different, customizable functions are provided, each of which then constitutes the source of the training pattern data.

Figure 13:
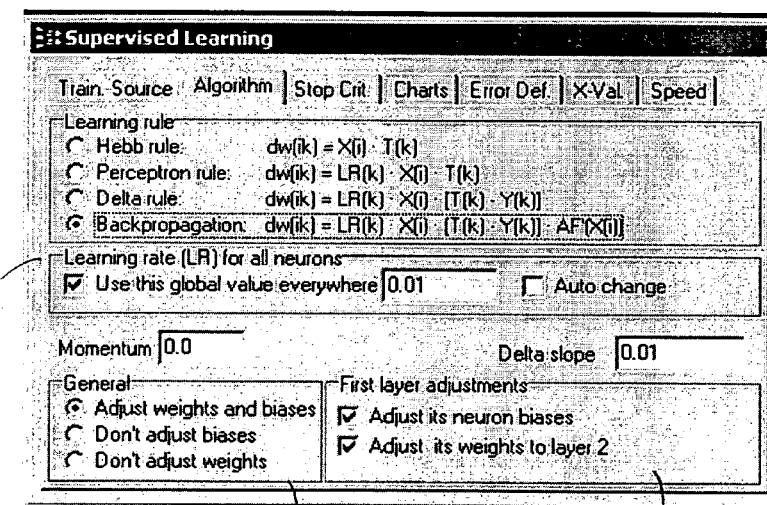

Turning to FIG. 13, the panel 252 may include a page 264 to specify a learning algorithm, such as backpropagation, Delta rule, Perceptron Rule or Hebb Rule, thereby generally determining the way in which the iteration values are calculated during training. The page 264 may also be used to specify a learning rate via a dedicated input data field, as well as optional selections to use the rate value globally and to allow automatic changes thereto if, for instance, the error increases after an iteration. Further input data fields may be provided to specify momentum and Delta slope values, as shown in FIG. 13. The page 264 may also include panels 266 and 268 for specification of general options and first layer adjustment options, respectively. The general options address whether to adjust weights and biases (or, more generally, what will be adjusted during training), while the first (i.e., input) layer adjustments may involve an adjustment of its neuron biases or its weights to layer two As an input layer, no adjustments are allowed to the biases and weights for the neurons in the first layer by default, but nonetheless, the user is provided with the option to override the default setting.

Figure 14:
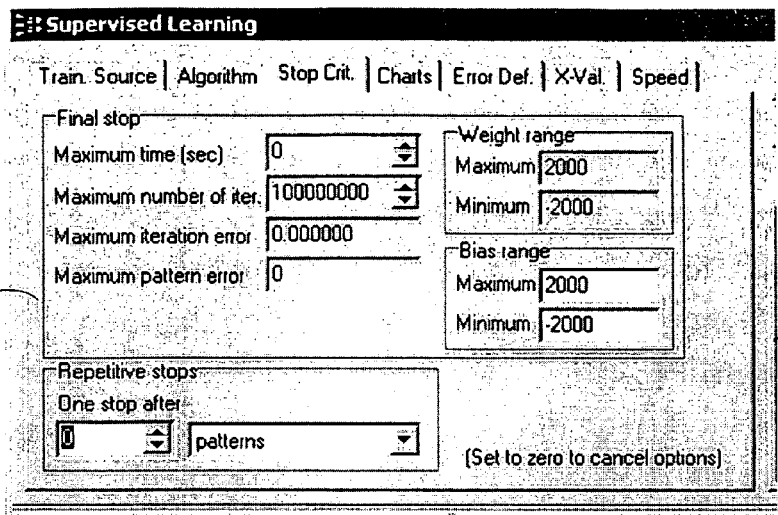

As shown in FIG. 14, selection of a stop criteria tab results in the generation of a page 270 of the panel 252 in which various criteria for stopping the supervised learning or training may be specified by the user. Although the training may be stopped at any time by the user via actuation of the "Stop" button (see FIG. 11), a number of options are provided to establish various conditions for automatic stops or pauses. More specifically, the page 270 includes a number of input data panels for specifying maximums (or thresholds) for the learning time, number of iterations, iteration error, and pattern error. Furthermore, the page 270 may include input data fields for specifying maximum and minimum values for a weight range and a bias range. Any combination of the foregoing stop criteria may determine a stopping condition. The foregoing stop criteria may provide the conditions for a final stop (i.e., no option to resume training), while other stop criteria may constitute either final stop criteria or non-final, or repetitive, stop criteria. The page 270 may provide an option for a non-final stop after a user-specified number of patterns, training iterations or cross-validation tests. As shown in the exemplary panel 270, setting the final or non-final stop parameters to zero may be one way in which the user can configure the supervised learning process to not conduct repetitive or other stops automatically. More generally, the foregoing stop criteria may, either individually or collectively, provide an automatic stop process option to stop the calculations at user-specified, user-desired, or other points in the training process to support a number of different design, evaluation and simulation purposes, including allowing the viewing of intermediate or temporal results to test for convergence issues or for design debugging. Stopping the training process may also provide an opportunity to save the network design for use later in, for instance, a network averaging operation. Selecting the continue option (e.g., via actuation of the Continue button shown in FIG. 11) resumes the training in connection with non-final stops.

Figure 15:
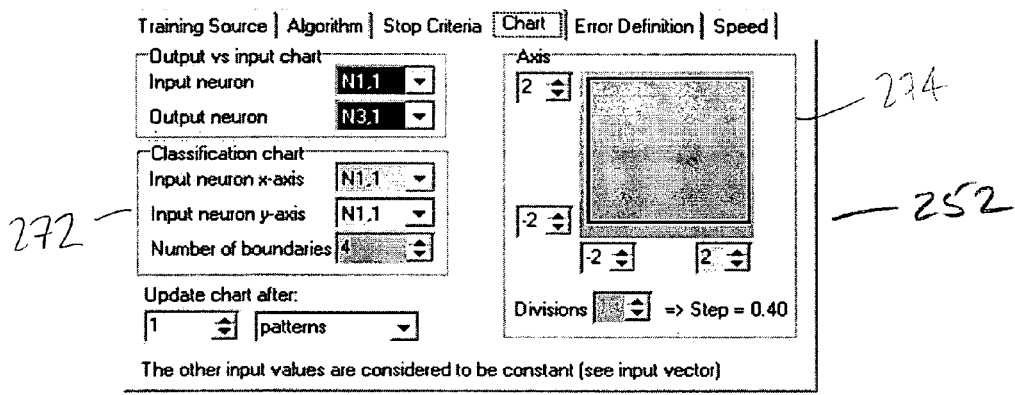

FIG. 15 shows the panel 252 after selection of a chart tab to reveal a page 272 generally directed to specifying configuration parameters for the charts available via the panel 256 of the display interface window 250 (as best shown in FIG. 11). The charts are generally useful to display iteration results either during or after training. For example, the output versus input chart may be configured to show data corresponding with a user-selectable input neuron and output neuron on the x- and y-axes, respectively. The output value represents the current network output when the specified input is presented to the network. When using a multidimensional input set, the input values for the other dimensions may be held constant and taken from, e.g., the first pattern. Another chart, the classification chart, generally depicts the dividing line separating the two-dimensional plane determined by the input neurons assigned to the two axes. Thus, the classification chart may be customized by input neuron x-axis and y-axis via selection of corresponding neurons and a specification of the number of boundaries. The page 272 may also provide the user with an option to specify an update display rate for the charts, such as an update after a user-specified number of patterns or iterations. This option may be useful to facilitate observation of the training process (i.e., with more frequent updates) or to enable faster processing times (i.e., with less frequent updates). Lastly, ranges for the chart may be set forth in a section 274 of the page 272 via pairs of data input fields for the x- and y-axes. The user-specified ranges may then be divided in accordance with a user-specified number of divisions via an entry in another data input field of the section 274.

Figure 16:
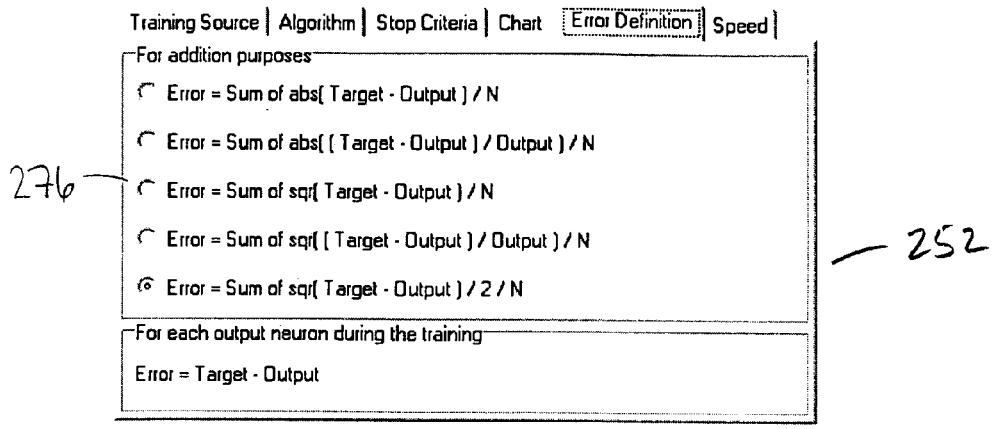

Turning to FIG. 16, the panel 252 may include a page 276 accessed via selection of an error definition tab for user-specification of an error equation, such as a summation of the absolute value of the difference between the target and output values divided by the total number of values. A number of other available error equations, or formulas, are displayed via the page 276 and made available to the user for selection via, for instance, respective selection boxes. In an alternative embodiment, the error definition page 276 may reveal a pair of sub-pages directed to providing information regarding various optional error definitions as well as an opportunity to specify an error parameter for classification error calculation. More specifically, a section of the page 276 may be directed to approximation calculations for the error, such as a linear neuronal error definition, a pattern error definition, and an iteration error (cost function) definition. A classification section of the page 276 may then provide information regarding multi-category classification, including information regarding exemplary targets and the computation of classification error via a binary function based on a Euclidian distance error threshold.

Figure 17:
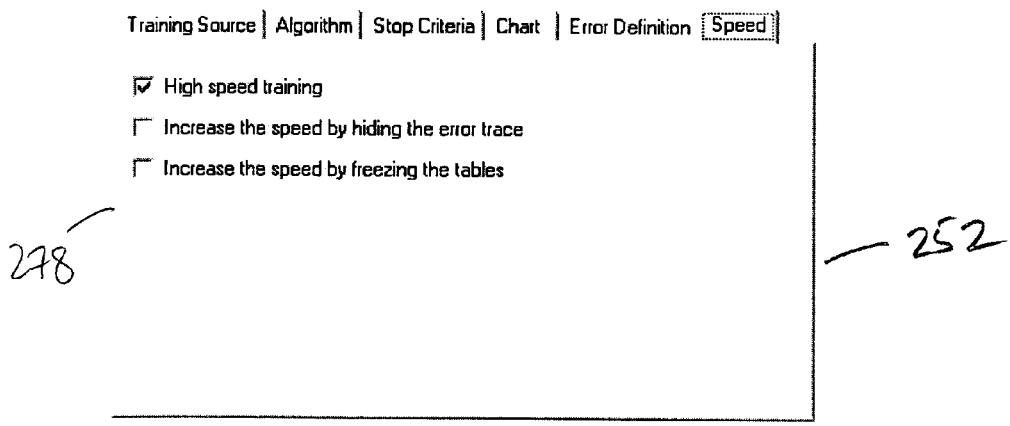

As shown in FIG. 17, the panel 252 may include a page 278 to support the configuration or customization of the supervised learning process by adjusting the speed at which the training algorithm is executed. Speed adjustments may, for instance, be useful to inexperienced users attempting to track the progress of the supervised learning process. In any event, the user is provided with an option to increase the speed at which the learning process is executed via, for example, selection of a high speed training option, or other options for hiding the error trace or freezing the tables. Selection of any one or more of these options generally results in an increased execution speed. The foregoing options are exemplary in nature, and are presented with the understanding that further speed adjustments may be made to customize the disclosed programming tool for the operational circumstance in which it is being implemented. In any case, such speed adjustments may be useful in connection with application of the disclosed programming tool to research or industry problems where user observation of the training process is either not required or of less interest. Thus, one or more of the options associated with quicker processing speeds may be utilized in an industrial (or other non-teaching) operational mode of the disclosed programming tool, while the options associated with slower processing speeds may be utilized in a teaching mode.

FIGS. 18-22 depict further representations of the display interface elements generated by the learning pattern module 108. As shown in connection with the exemplary embodiment, the learning pattern module 108 provides functionality beyond supporting the creation, editing, and viewing of the pattern data set(s). Specifically, the learning pattern module 108 may support the customization and setup of pattern data sets for cross-validation techniques, as well as perform analysis of the pattern data sets to determine their suitability for use in training and/or testing the neural network.

Figure 18:
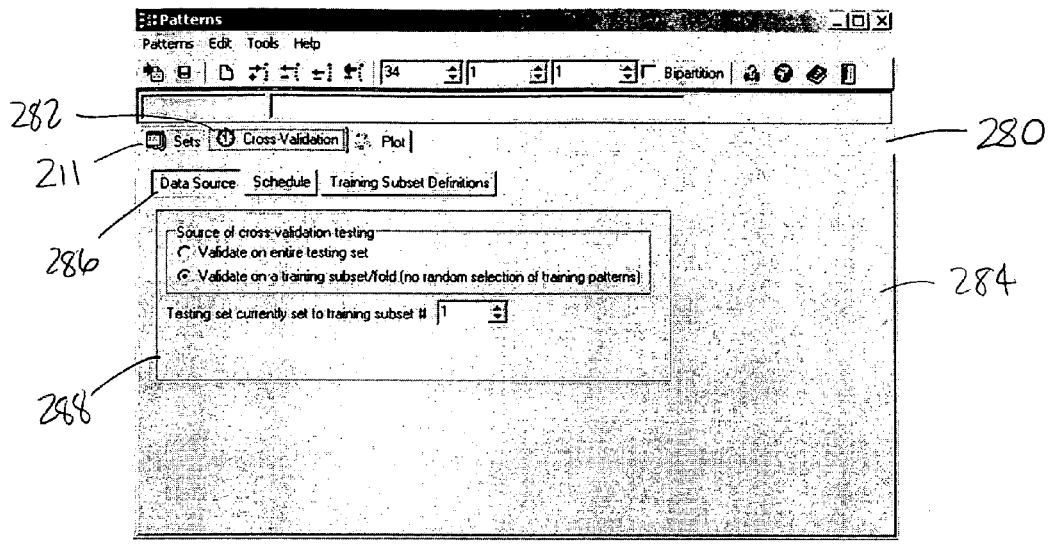
FIGS. 18-20 are simplified depictions of an exemplary window of the display interface generated by the learning patterns module of FIG. 1 to support selection of options for implementation of the supervised learning tool with cross-validation.

With reference to FIG. 18, the learning pattern module 108 may generate a display interface window 280 directed to supporting the use of cross-validation techniques in connection with training, for instance, a feedforward network. To that end, the supervised learning module 106 (FIG. 1) may include an option (via a selection box, checkbox or other display element) to use cross validation during the learning process. In the embodiment shown in FIG. 11, the panel 252 of the window 250 shows a cross validation tab for selection by the user to present this optional selection. Alternative embodiments may provide the cross-validation option in a different manner, as desired.

The display interface window 280 may, but need not, correspond with the window 190 shown in FIG. 9 and described in connection with other pattern data management functionality provided by the learning pattern module 108. In that case, however, the display interface window 280 may provide a cross validation tab 282 (in addition to the sets tab 211) to reveal a page 284 directed to the customization of, and options available for, cross validation. In this exemplary case, selection of a data source option via a button 286 or other interface element (as desired) causes a panel 288 to be displayed on the page 284 for user identification of a source of cross validation testing data. More specifically, the user is given an option via checkboxes or otherwise to select validating on the entire testing pattern data set, or a subset or fold of the training pattern data set. In the event that the latter option is selected, the panel 288 may enable a data input field for user specification of the training subset number to be utilized for testing. Otherwise, the data input field may be deactivated to prevent confusion as to the source of testing data.

Figure 19:
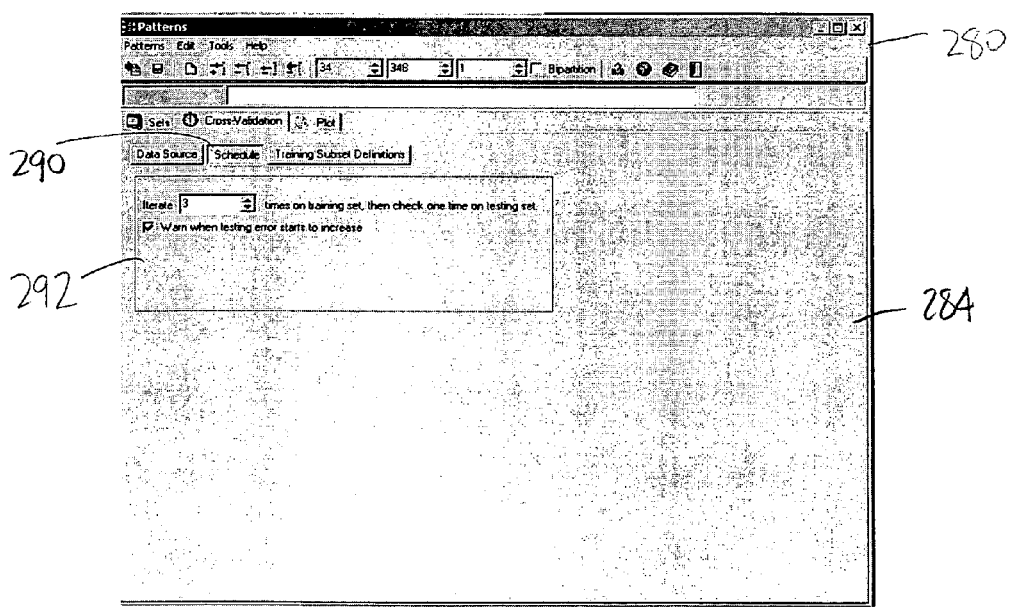

As shown in FIG. 19, the display interface window 280 may be used to further customize the cross validation process by allowing a user to specify how many iterations in the training set have to be executed before testing on the testing set. In this exemplary embodiment, such functionality is provided via a button 290 shown on the page 284, the actuation of which causes a panel 292 to display an input data field to support such specification. The panel 292 may also include a checkbox or other interface element to support user selection of an option directed to warning when testing error starts to increase during the cross-validation process. More generally, the display interface window 280 and the customization of the cross-validation process enabled thereby supports the adjustment of the timing of the testing of the neural network for validation thereof.

Figure 20:
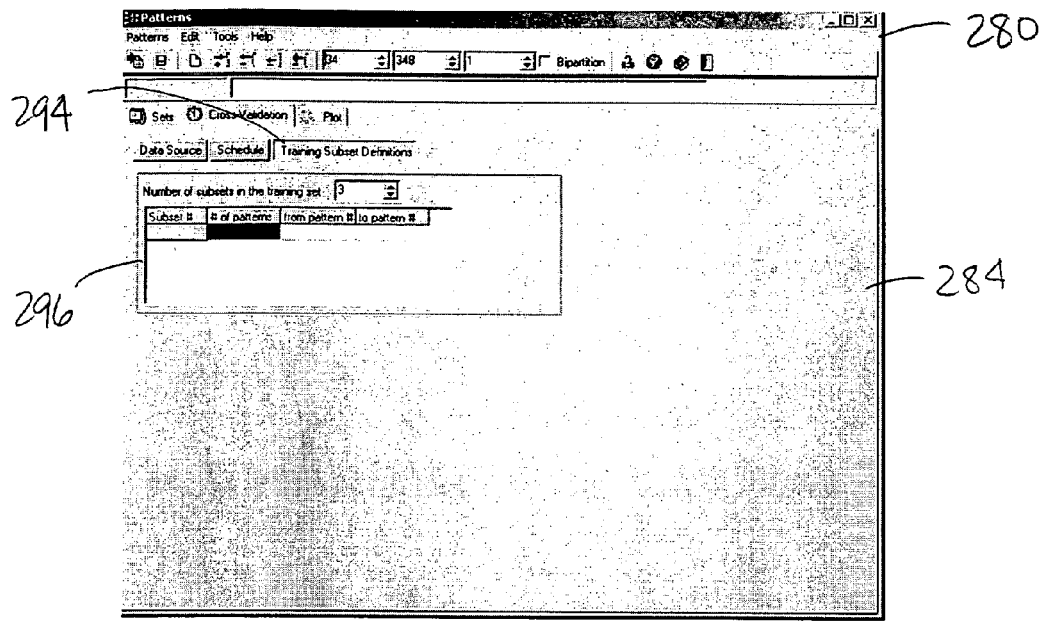

Customization of the cross-validation process is further supported via the display interface window 280 by supporting the specification or definition of the subsets of the training pattern data set, as shown in FIG. 20. In this embodiment, the page 284 includes a training subset definitions button 294, the actuation of which results in the generation of a panel 296 having an input data field for selection of a number of subsets in the training set. Upon that selection, a table in the panel 296 may provide the user with an opportunity to further define each subset, for instance, by specifying a number of patterns within each subset and identifying the range of patterns within each subset. In this way, the user may specify a subset of the pattern data otherwise made available for training the neural network. Accordingly, the testing pattern data set may be a subset of the set of pattern data otherwise considered for training purposes.

Figure 21:
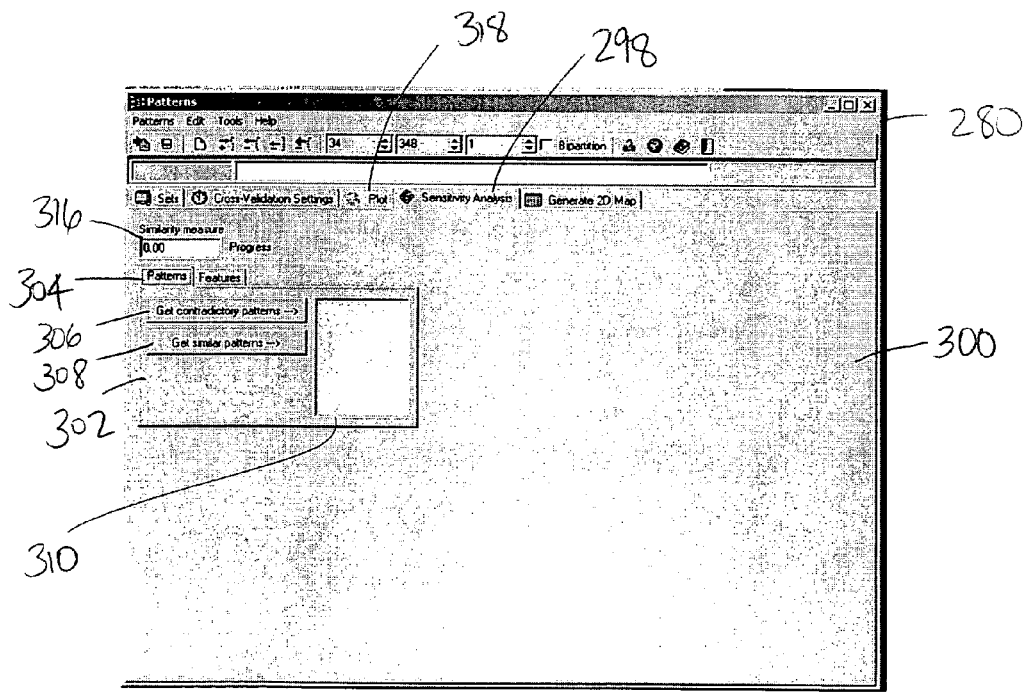
FIGS. 21 and 22 are simplified depictions of an exemplary window of the display interface generated by the learning patterns module of FIG. 1 to support sensitivity analysis of the pattern data sets for training the artificial neural network.
Figure 22:
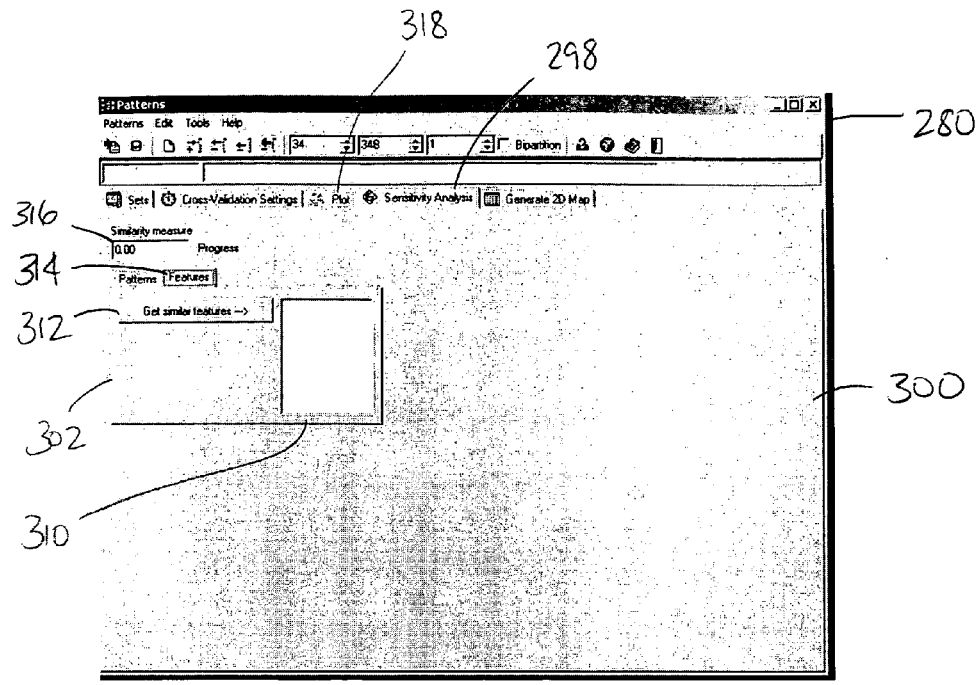

Turning to FIGS. 21 and 22, the display interface window 280 is shown after selection of a sensitivity analysis tab 298 to reveal a page 300 generally directed to analysis of the pattern data set(s). Such analysis may include sensitivity analysis capable of identifying duplicative patterns, conflicting patterns or other problematic patterns within the pattern data set(s) directed to either training or testing. To that end, the page 300 includes a panel 302 having a first tab 304 (FIG. 21) to enable such analysis. In this exemplary embodiment, the analysis is initiated via user selection of a button 306 or a button 308 to initiate analysis of the pattern data set(s) for duplicative and conflicting patterns, respectively. In alternative embodiment, the buttons 306 and 308 may be replaced with selection boxes or other interface elements suitable for initiating the implementation of the one or more routines associated with the analysis. As shown in FIG. 21, the analysis may be directed to identifying contradictory patterns and similar patterns, such that patterns need not be identically duplicative or directly conflicting to be identified by the routines. Selection of one of the buttons 306 and 308, and implementation of the respective routines, may result in the display of qualifying (or captured) patterns in panel or box 310, which may be modified in the conventional manner with scroll bars and the like to accommodate a large list of patterns.

As shown in FIG. 22, the panel 302 of the page 300 may reveal an additional button or interface element 312 for the initiation of further sensitivity analysis in connection with the variables that make up each pattern. In this embodiment, a tab 314 may be selected by a user to reveal this portion of the panel 302. Generally speaking, such sensitivity analysis is directed to identifying whether any variable of the pattern table is unnecessary due to its similarity with another variable. For instance, if one variable is merely a linear multiple of another variable, one of the two variables may be removed to simplify computations and increase the speed at which the network is either trained or executed. The similar variables, or features, of the patterns may then be identified in the panel or box 310 for review by the user.

The learning pattern module 108 (FIG. 1) may provide a threshold for considerations of similarity in a pattern data set via known quantification methods. The results of such quantification methods may be displayed in the panel or box 310 shown in both FIGS. 21 and 22. In some embodiments, the degree of similarity may be tailored to whether the sensitivity analysis routines are directed to identifying duplicative or conflicting patterns, or identifying unnecessary pattern variables. In such cases, the data fields 316 may provide a different similarity measurement or indication depending on whether the patterns tab 304 or the features 314 is selected by the user.

After completing or otherwise implementing the above-described sensitivity analysis, the user may utilize the information regarding the patterns and pattern variables to modify (and improve) the pattern data set(s) for use in training and testing the neural network. To that end, the other display interface windows or interface elements generated by the learning pattern module 108 may be used to edit or modify the pattern data set(s). For example, the user may then proceed to select the sets tab 211 (FIG. 9) and proceed with the deletion or other modification of the pattern data sets via the editable tables.

In the exemplary embodiment shown in FIGS. 21 and 22, the learning pattern module 108 generally supports the management of the pattern data set(s) via a data plotting routine or routines thereof, the implementation of which may be initiated via selection of a plot tab 318 of the display interface window 280. The data plotting routines may present the current pattern data set in a wide variety of manners, as desired, as well as in accordance with the nature of the data being plotted. For instance, selection of the tab 318 may provide a user with an option to select the variables to plot in two-dimensional or three-dimensional graphs. Furthermore, any number of formats for the plots or graphs generated by the data plotting routines may be appropriate and useful as another mechanism for viewing and analyzing the pattern data set(s). For instance, the capability to graphically present information regarding the pattern data set(s) may reveal relationships or other characteristics thereof not as easily recognizable when the data is presented in tabular or other formats. In this way, the user's ability to manage the pattern data sets for both training and testing is further improved.

After use of the network configuration modules 102 and the learning pattern module 108, the disclosed programming tool may generally be used to evaluate the performance of the configured neural network in connection with the training and/or testing pattern data sets previously established by the above-described functionality. To this end, the performance evaluation module 110 (FIG. 1) may be implemented to generate one or more display interfaces directed to computing or providing a performance metric based on the test results. The performance evaluation module 110 may rely on, or execute, a number of different types of tests, and is not limited to the testing methods described in connection with the exemplary embodiments hereof.

Figure 23:
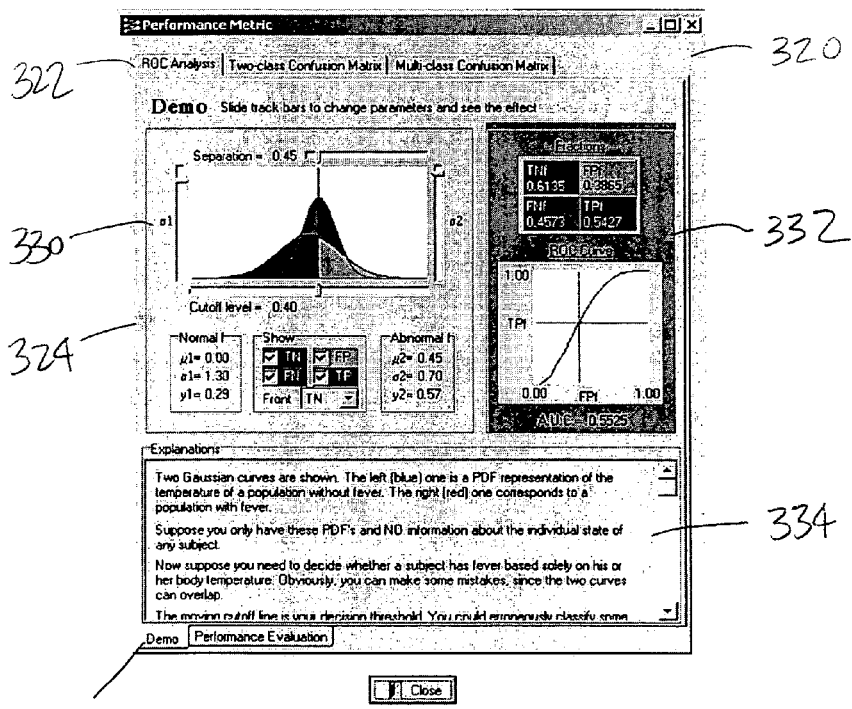
FIGS. 23 and 24 are simplified depictions of an exemplary window of the display interface generated by the performance metric module of FIG. 1 to support generation of a performance metric for the artificial neural network via receiver operating characteristics (ROC) analysis.

With reference now to FIG. 23, the performance evaluation module 110 may generate a display interface window 320 having a number of tabbed pages to display evaluation information and facilitate the evaluation process. In the exemplary embodiment shown, the tabbed pages of the display interface window 320 may be dedicated to supporting separate evaluation methods or techniques such as ROC analysis, two-class confusion matrix analysis, and multi-class confusion matrix analysis. Each of these evaluation methods or techniques generally provides a performance metric (e.g., indication) based on the simulation and/or testing of the current neural network. In alternative embodiments, other evaluation methods or techniques may be added or substituted, as desired. In any case, the performance metrics generated by the methods or techniques may take any appropriate form. For example, the performance metric may be presented or depicted via the display interface window 320 in a graphical manner (e.g., a curve or other graph), as a series of data points (e.g., multiple classification rates), or otherwise as known to those skilled in the art.

In some embodiments, the data underlying the performance of the neural network being evaluated may, but need not, be provided automatically to the performance metric evaluation module 112 (FIG. 1) for computation of one or more of the performance metrics available and/or compatible with the network type and results. In some cases, the data may be generated as a result, for instance, of the generalization or other testing implemented by one of the configuration network modules 102, or one of the support modules, such as the supervised training module 106 or the learning pattern module 108. Once a generalization test is complete, data indicative of the test results may be stored and/or compiled with additional test result data. Eventually, the test result data may be transmitted to, accessed by, or otherwise made available to the performance metric evaluation module 108. To that end, the user may select between options directed to the storing, compilation and/or delivery of the test result data in embodiments where such functionality is not automatically provided after the testing is conducted.

Generally speaking, the performance evaluation module 110 may process the test result data to generate the performance metric(s) to provide the user with an indication of how well the neural network is performing as currently configured (and trained, as appropriate). To that end, the performance evaluation module 110 may be adapted to receive test result data in various forms that differ in, for instance, the degree of assimilation, aggregation or abstraction. Thus, the performance evaluation module 110 may, in some cases, include functionality directed to pre-processing the test result data to an extent necessary for formatting, etc. The display interface window 320 may be used to control both such pre-processing as well as the processing required to compute the performance metric itself. Eventually, the display interface window 320 may also provide the performance metric(s) generated as a result of the processing.

The display interface window 320 includes a tab 322 to access performance evaluation methods in accordance with receiver operating characteristics (ROC) analysis. Selection of the tab 322 causes the performance evaluation module 110 to generate a panel 324 having a demonstration mode (or portion) and an execution mode (or portion). As shown in FIG. 23, the demonstration mode is accessed via selection of a tab 326. The execution mode is accessed via selection of a tab 328, and is described below in connection with FIG. 24.

With continued reference to FIG. 23, the panel 324 includes a section or panel 330 that provides an interactive simulation to support, for instance, efforts to educate a new user to the manner in which ROC analysis is useful in presenting the classification performance of a neural network. The interactive simulation centers on a plot shown in the panel 330 that includes several slide elements to adjust parameters relevant to the analysis, such as the distributions representative of network variables, and a decision threshold for classification purposes. Adjusting the parameters results in corresponding modifications to an ROC curve set forth in a section or panel 332 of the panel 324. Also dynamically updated as a result of the modified parameters are data values presented in the panel 330 that are relevant to the ROC analysis. Explanation(s) of the significance of these data values and other aspects of the ROC analysis demonstration may be set forth in a section or panel 334. The explanatory text and graphics set forth in the panel 334 may define the parameters and other terminology utilized in the demonstration and throughout the ROC analysis process. To that end, a scroll bar may be utilized to access further information.

Figure 24:
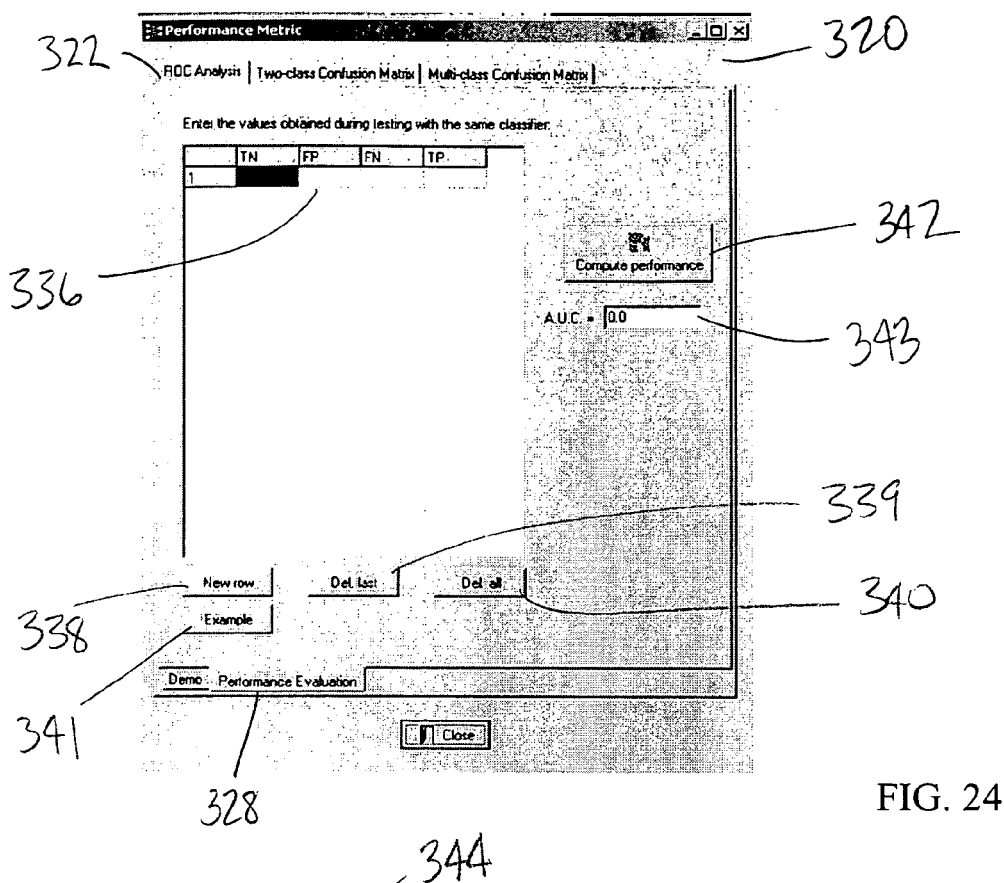

FIG. 24 shows the display interface window 320 in the execution mode of the ROC analysis. To reach this mode, the ROC analysis and performance evaluation tabs 322 and 328, respectively, may be selected. Implementation of the routine(s) of the performance evaluation module 110 associated with ROC analysis generally provides an indication of classification performance, as is well known to those skilled in the art. To that end, one embodiment of the disclosed programming tool supports the entry of values in a data input table 336, the values being indicative of the output results obtained during testing with the same classifier (i.e., neural network). For example, the output results may be characterized by true-negative (TN), false-positive (FP), false-negative (FN) and true-positive (TP) in accordance with the classification made as the output of the neural network. Values indicative of the number of true-negatives, false-negatives, etc. may then be entered in tabular cells, each of which provides a data input field to accept respective values. To these ends, exemplary buttons 338 (New Row), 339 (Delete Last Row), 340 (Delete All Rows), and 341 (Show Example) may be provided to facilitate the data entry process.

After entry of the test result data, the computation of the performance metric is initiated by user selection of a button 342. In some cases, the results of the ROC analysis computations may be presented both graphically via an ROC curve (e.g., an area-under-curve plot) and via one or more data display fields (e.g,. field 343) for showing the resultant ROC values. Such presentations may, but need not, be set forth in a display interface window, panel or other interface element apart from the display element window 320. The presentation may also appear similar to the manner in which the ROC curve and other ROC analysis information is set forth in the panels 330 and 332.

Figure 25:
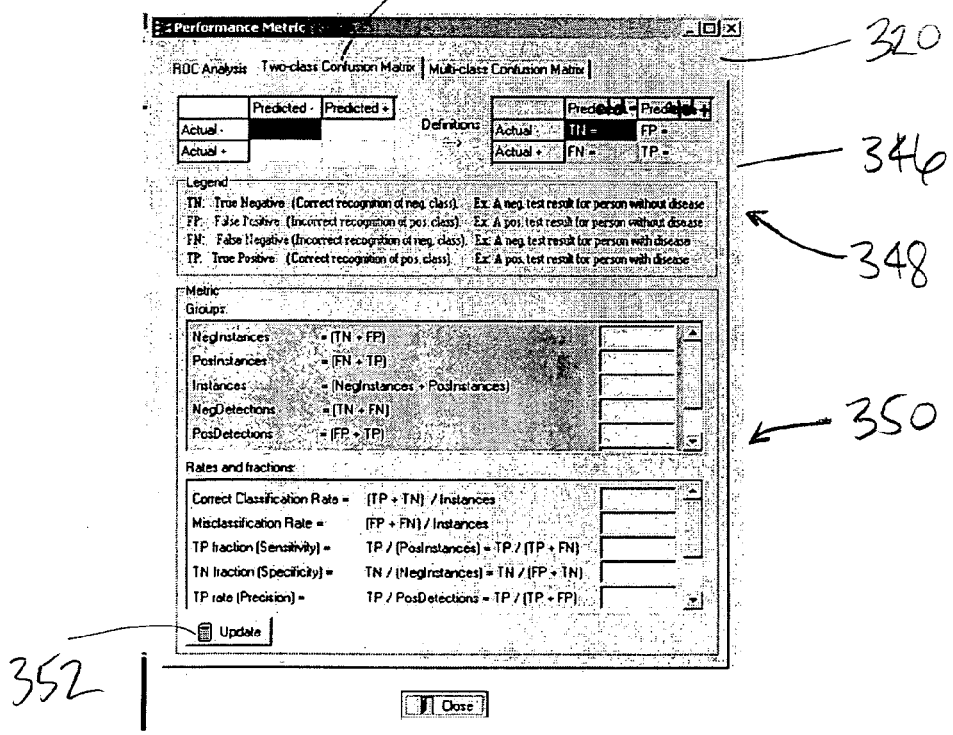
FIGS. 25 and 26 are simplified depictions of the exemplary window of FIGS. 23 and 24 where the performance metric for the artificial neural network can be computed by either a two-class or a multi-class confusion matrix analysis, depending on the topology of the neural network, e.g., the number of classes that the network is supposed to classify.

Turning to FIG. 25, the performance evaluation module 110 (FIG. 1) may also support two-class confusion matrix analysis to generate one or more further performance evaluation metrics. To support this analysis, the display interface window 320 includes a tab 344, the selection of which results in the generation of a page 346 having a test result data entry section and an evaluation metric output section indicated generally at 348 and 350, respectively. The test result data entry section 348 of the page 346 generally facilitates user entry of classification performance data, which may be similar in nature to that described above in connection with the ROC analysis. The test result data entry section 348 may also include a legend or other area reserved for instructions, definitions or other text to assist the user in the data entry process.

Upon entry of the test result data, selection of an Update button 352 may be used to calculate a number of performance metrics therefrom, including, for instance, total numbers or groups of certain classifications or classification combinations (e.g., negative instances, or TN+FP), as well as a number of rates or fractions involving the classifications (e.g., a sensitivity rate based on the TP fraction, or the ratio of TP to total positive instances). Each of these metrics may be set forth in respective data display fields within the section 350 of the page 346. Scroll bars may be provided to facilitate the display of additional performance metrics in the space available within the section 350.

Figures 26, 27:
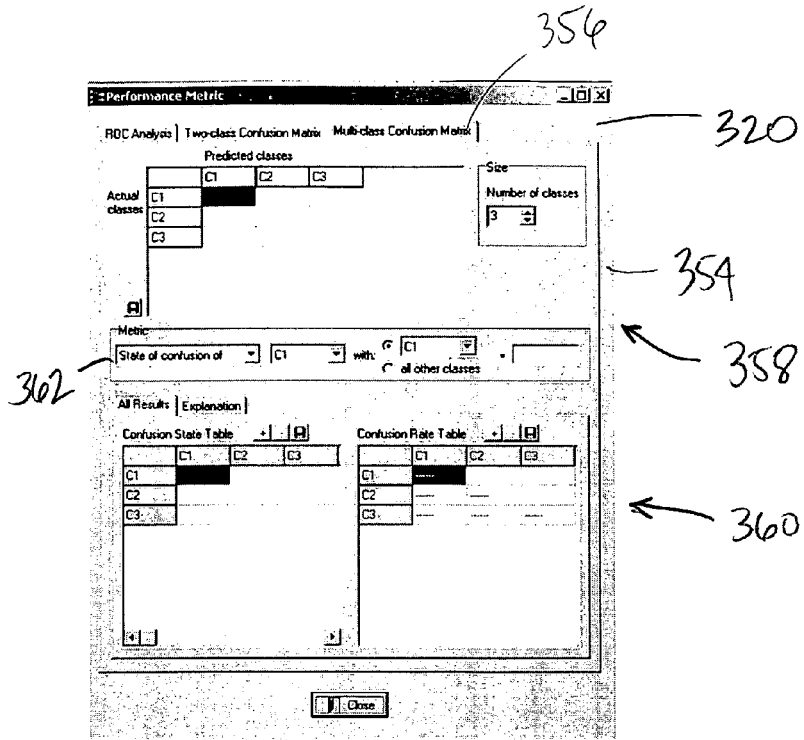
FIG. 27 is a simplified depiction of an exemplary window of a display interface generated by a code insight module to display code excerpts of processes or algorithms implemented during the training of an artificial neural network designed using the application.

FIG. 26 shows a further page 354 of the display interface window 320 accessed via a tab 356 thereof and directed to multi-class confusion matrix analysis for those neural networks having a topology with more than two classes. As in the two-class context, the page 354 includes an input data section and an output section indicated generally at 358 and 360, respectively. The page 354 further includes a panel 362 to support user selection of the classes to be analyzed for either a state or rate of confusion. Selection between confusion states and confusion rates between the selected classes is also facilitated by a drop-down box within the panel 362.

Upon entry of the test result data via the input section 358, the performance evaluation module 110 (FIG. 1) performs the necessary computations to arrive at the confusion state(s) or rate(s) and modifies the output section 360 accordingly. The output section 360 may present viewing options to the user to support presentation or analysis of minimum and maximum values of the confusion states or rates. The output section 350 may also provide the user with the option of storing the confusion matrix data to a file or other location for future analysis, use, etc.

Some aspects of the disclosed programming tool may be directed to supporting an effort to teach or educate users as to the nature of the underlying algorithms involved in neural network design, training, and simulation. With that purpose in mind, and with reference now to FIG. 27, a display interface window 370 may be provided for displaying code samples representative of processes implemented in connection with the neural networks supported by the disclosed programming tool. The display interface window 370 may be generated as a result of the implementation of the code insight module 116, one of the support modules that may be initiated or accessed via the main window 132 (FIG. 3) from the main module 100 (FIG. 1).

The code samples may correspond with respective processes, procedures, algorithms or other sequences implemented during network design, training, and simulation. The display interface window 370 may include a text panel 372 to display the code sample, which may be selected via tabs or any other suitable display interface mechanism. In the exemplary embodiment shown, respective tabs are provided for displaying samples corresponding with the following sequences: backpropagation; self-organizing maps; clustering; pattern association; fixed weight networks; and, support vector machines. For example, the code samples may correspond with the portions of the routines responsible for configuring the network of the selected type and, as such, correspond with the steps taken by one of the network configuration modules 102. However, the code samples may be set forth in representative fashion rather than reveal the actual source code underlying the module 102. In any case, the display of such code samples may be useful in education and other uses of the disclosed programming tool, which, as a result of the user-friendly interface, does not otherwise force the user to utilize any code, script or other languages to control the configuration and simulation of the neural networks.

Figure 28:
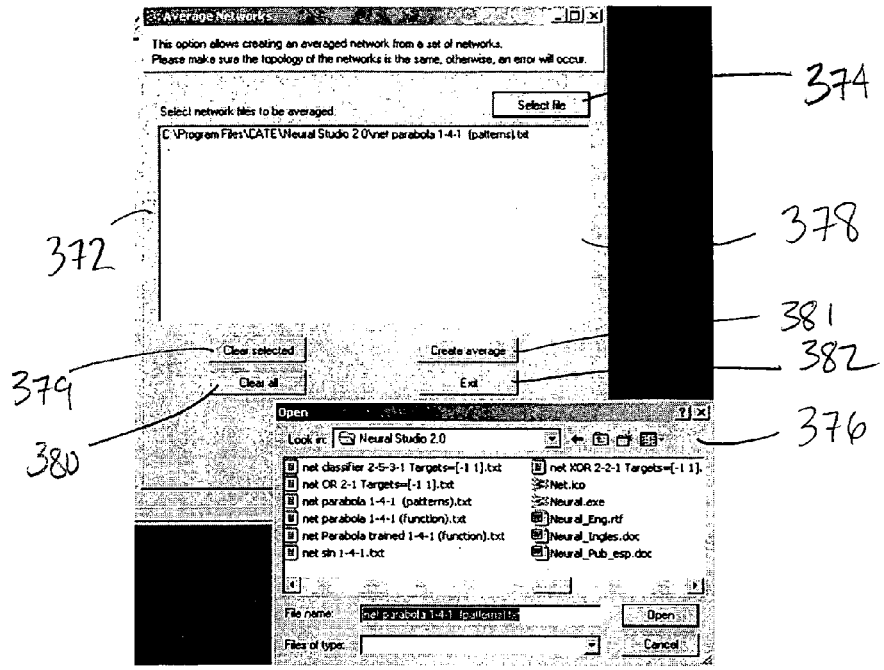
FIG. 28 is a simplified depiction of an exemplary window of a display interface generated by a network averaging module.

The implementation of another support module or configuration tool, the network averaging module 118, is depicted in FIG. 28. Selection of this option or tool via the main window 132 (FIG. 3) results in the generation of a display interface window 372 that generally supports the identification of multiple files representative of a set of previously created neural networks ("network files") for creation of an average network. To that end, a button or other interface mechanism 374 may be selected to generate a window or dialog box 376 to facilitate the search for, and specification of, the network data to be included in the averaging computation. Selection of a file via the dialog box 376 then causes the file to be listed, along with any other selected files, within a display field 378 of the display interface window 372. Control buttons 379-382 may then be used to clear or remove selected files from the display field 378, clear all the files from the display field 378, create the average network, and exit the network averaging module 118. Other interface schemes or mechanisms may be used to facilitate such actions, as desired. In any case, however, the creation of average networks may be useful in connection with multiple, saved instances of a network as it was trained by different subsets or portions of a single pattern data set, or different pattern data sets, as well as at different times or iterations during the training process. In this way, the resulting files indicative of the neural network have data directed to networks of the same topology and, thus, be suitable for averaging.

Figure 29:
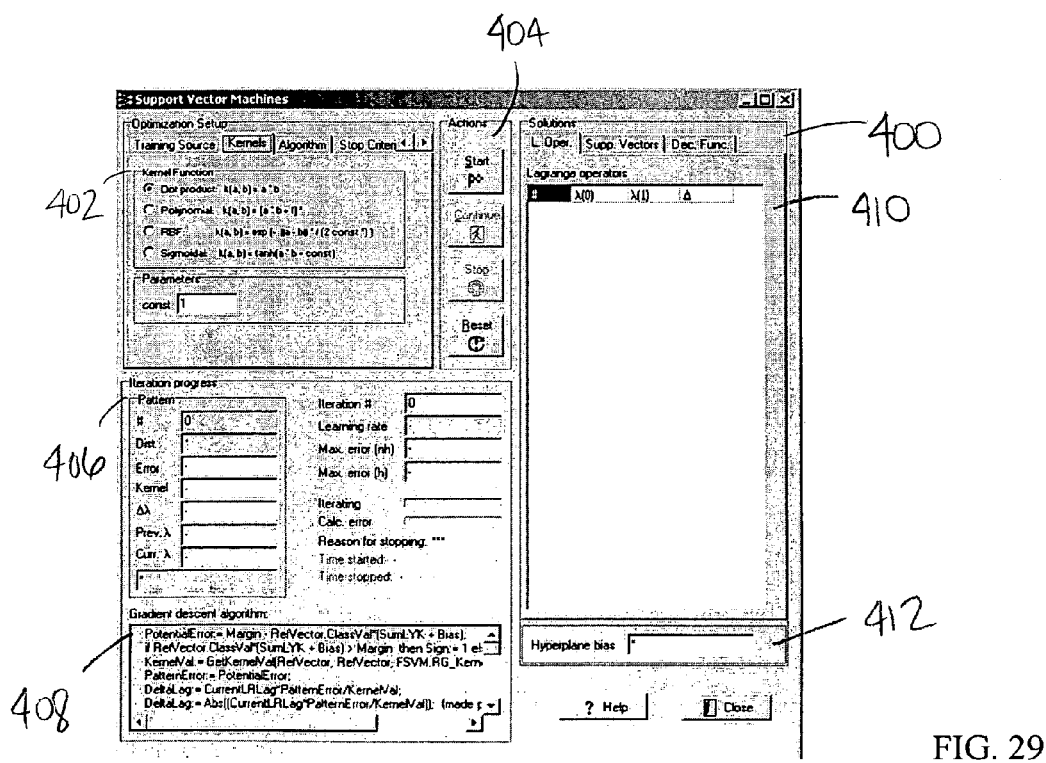
FIGS. 29-30 are simplified depictions of an exemplary window of a display interface generated by a support vector machines module to support comparison testing.
Figure 30:
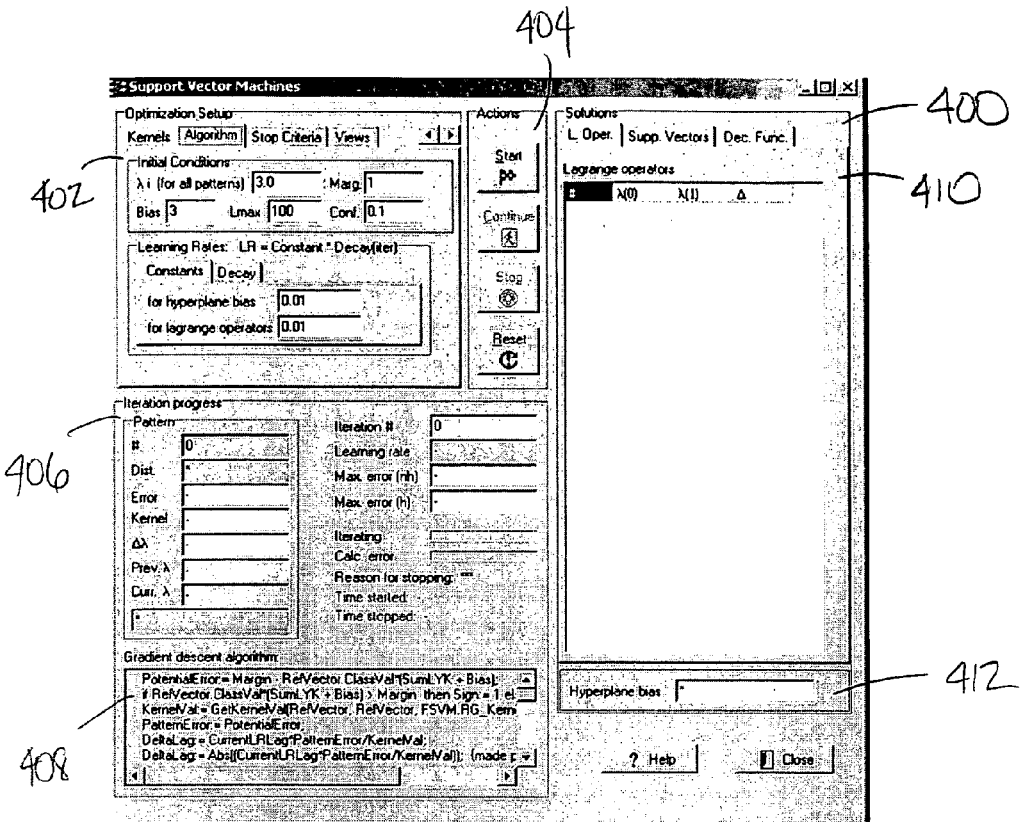

FIGS. 29 and 30 depict two instances of a display interface window 400 generated via implementation of the support vector machines module 112 (FIG. 1). As described above, the use of support vector machines generally provides, among other things, a comparison mechanism for evaluating the performance of neural networks designed for two-category classification using one of the network configuration modules 102 (although, of course, the feedforward networks module 102, for instance, may be used to design networks capable of multi-category classification). To that end, the display interface window 400 provides a number of options to setup or configure the support vector machine via a tabbed panel 402. Selection of tabs made available within the panel 402 provides pages to support the setup of the optimization procedure. For example, pages may be directed to the following categories: training source information, kernel types and parameters, algorithm (e.g., to define initial conditions and the learning rate), stop criteria (to specify conditions to temporarily stop the iterations), and viewing options (e.g., to specify the duration of stops for visualization), as well as any other setup options that may assist in the optimization of the support vector machine. For instance, selection of tabs 404 (FIG. 29) and 406 (FIG. 30) may provide options to select a kernel function (e.g., dot product, polynomial, etc.), as well as initial conditions (e.g., bias) and learning rates (e.g., constants for hyperplane bias and Lagrange operators), via the panel 402.

The display interface window 400 further includes an actions or operational panel 404, an iteration progress panel 406, an algorithm display panel 408, a solutions panel 410 and a box 412 to display the resulting hyperplane bias. Generally, the iteration progress panel 406 is directed to providing temporary, or intermediate, results of, and other data for, the iterations in a number of data display fields, while the results of the iterations are made available via the solutions panel 410, and may be divided into the following categories: Lagrange Operators, Support Vectors and Decision Function. Displaying the intermediate solution data allows a user to monitor or track the iterations, the intermediate data including iteration number, Lagrange operator increment, kernel values, error and the like. While such intermediate data may be directed to computing the support vectors, the display thereof may assist a user attempting to follow the calculations. Furthermore, the data may be updated at a user-selected rate or frequency set via the page in the panel 404 directed to viewing options. For additional instruction or teaching, the algorithm display panel 408 may set forth representative code.

Figure 31:
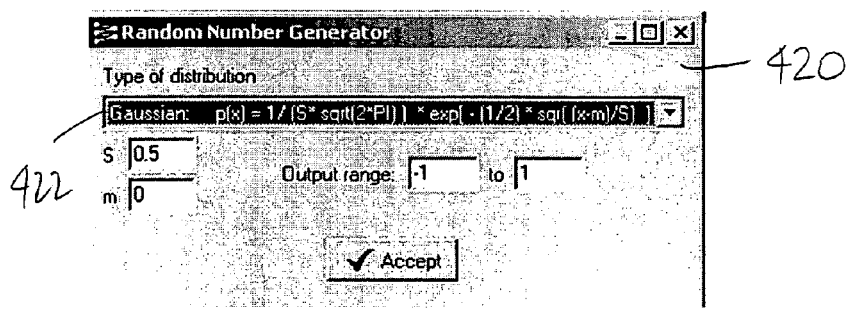
FIG. 31 is a simplified depiction of an exemplary window of a display interface generated by the main module of FIG. 1 to provide for customization of a random number generation tool.

With reference now to FIG. 31, a display interface window 420 may be provided in connection with the implementation of the random number generation module 120. Generally speaking, the module 120 provides the user with an opportunity to specify or select the distribution from which random numbers are to be calculated or derived during the implementation of other modules, as described above. To that end, the display interface window 420 may include a drop-down box 422 from which a probability distribution type may be selected. Exemplary distributions include Gaussian, exponential, and uniform (i.e., constant). Upon the selection of a distribution type, the display interface window 420 may present a number of data input fields to support the specification of one or more parameters for the formula of the selected distribution, including for instance, an output range.

FIGS. 32-45 depict a number of display interface windows generated in connection with the implementation of additional network configuration modules 102 of the disclosed programming tool, such as those directed to networks based on unsupervised training. The learning patterns module 108 and the display interface generated thereby may be used to generate training data for use in unsupervised training or learning, but, in these cases, the network is not trained toward specified outputs. Instead, the network seeks to find patterns or regularity in the input data. In some embodiments, the disclosed programming tool may include one or more modules to design networks directed to reveal the spatial distribution or the clustering of the pattern data. In the exemplary embodiment described below, the network configuration modules 102 are addressed for two network types of this nature: self-organizing (or Kohonen feature) maps and clusters.

With reference to FIGS. 32-40, the self-organizing maps configuration module 102 generally provides the capability to perform a spatial distribution analysis on the pattern data. To that end, the configuration module 102 may support a number of activities via a display interface generated thereby, such as (i) customizing or configuring the iterations (organized into categories), (ii) creating or entering patterns via a two-dimensional chart via mouse pointer clicks, (iii) visualizing the changes in the map any time a pattern is processed, (iv) displaying weight values after each iteration, and (v) showing which neurons are closest to other neurons after each iteration.

Figure 32:
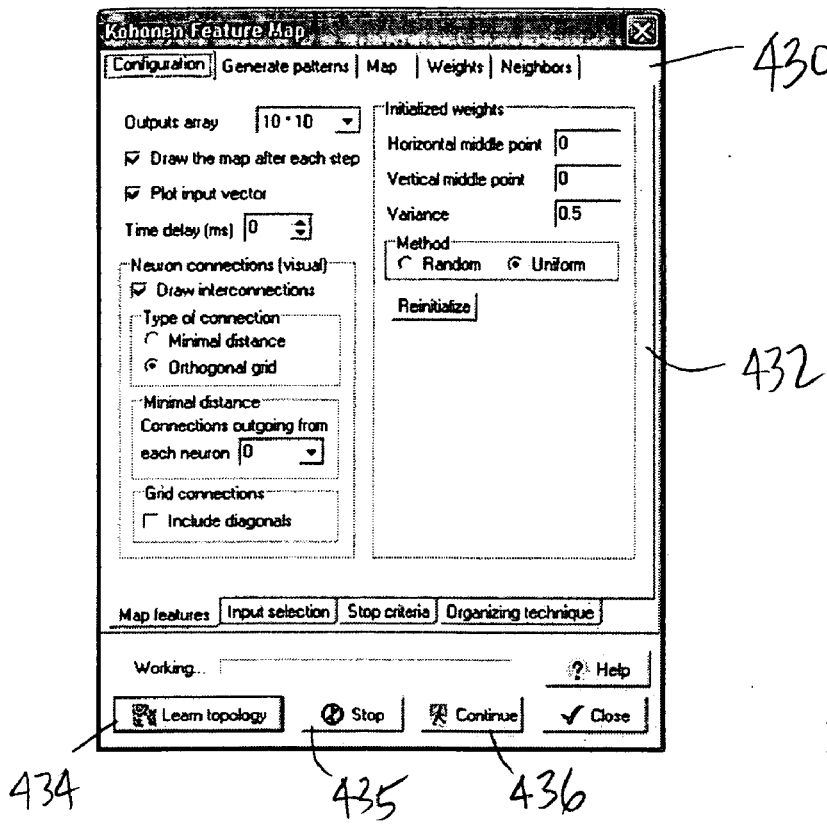
FIGS. 32-40 are simplified depictions of an exemplary window of a display interface generated by a self-organizing (or Kohonen feature) map configuration module.

Turning to FIG. 32, a display interface window 430 generated by the self-organizing map configuration module 102 includes a tabbed page 432 directed to establishing configuration and training options, such as map features, input selections, stop criteria and organizing techniques. In this view of the page 432, various options for the visualization of neuron connections, weight initialization, and map generation are provided. Map features customizable in this exemplary embodiment include the dimensions of the output array (e.g., 2×2, 3×3, 5×5, 10×10, etc.), whether to draw interconnections between the two-dimensional weights in the chart (as opposed to only drawing a point at the (x,y) location determined by the weight value), whether to draw the map after each step (faster processing speeds may be attainable with this option not selected), whether to draw the input vector, whether to implement a user-specified time delay for allowing the graphics changes to be slower for easier viewing, whether to initialize the weights via the random method or the uniform method. Below the page 432, buttons 434-436 to start, stop and continue the training are provided.

Figure 33:
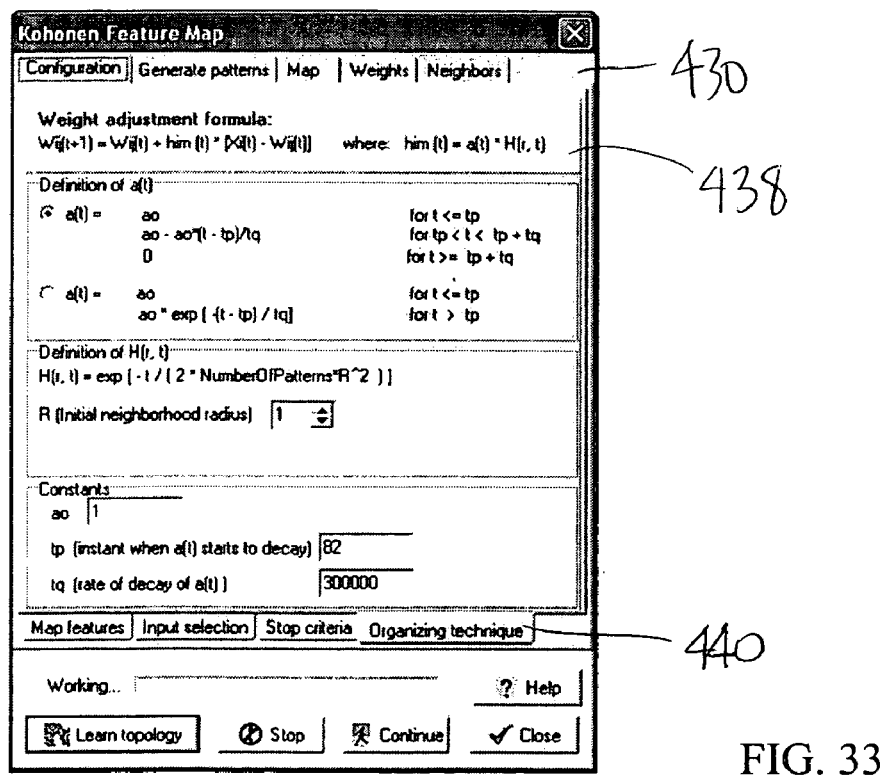

FIG. 33 shows a page 438 of the display interface window 430 accessed via selection of an Organizing Technique tab 440. The options provided by the page 438 support the customization of the weight adjustment formula, which includes the capability of selecting function type and parameters.

Figure 34:
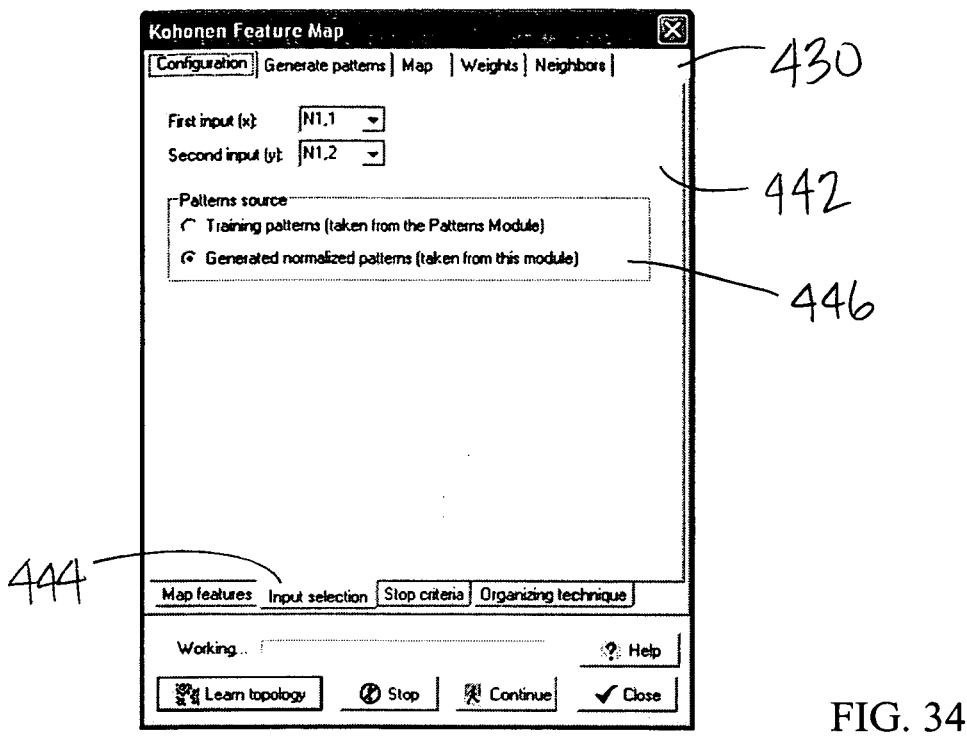

FIG. 34 shows a page 442 of the display interface window 430 accessed via selection of an Input Selection tab 444. The page 442 generally supports the selection of the two elements from each training pattern vector to be used as inputs to the network. More specifically, the user can specify the neurons for the two map dimensions via a pair of data input fields having dropdown boxes. A panel 446 supports the selection of the source of the training patterns. In this embodiment, two options are available. In the event that the user elects not to generate the patterns using the pattern generator made available by the self-organizing map configuration module 102 (described below), pattern data may be received from the learning patterns module 108. One of the advantages of the former option is that the feature map can be visually compared with the map used to generate the training patterns in order to evaluate the training performance.

Figure 35:
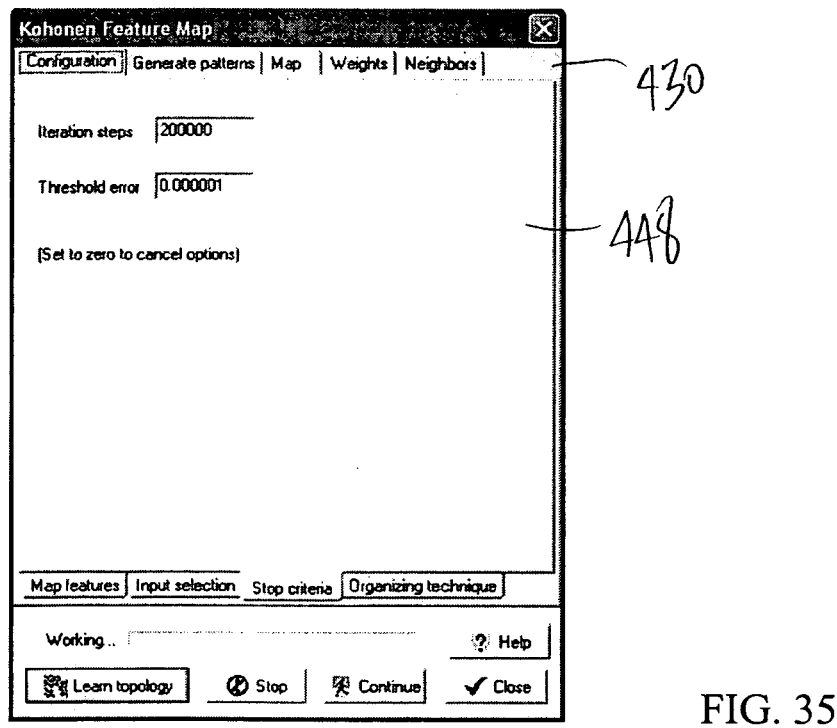

As shown in FIG. 35, a page 448 of the display interface window 430 provides an option to specify the conditions under which the iteration process is stopped. In this exemplary embodiment, the user may specify a number of iterations or a threshold error for this purpose.

Figure 36:
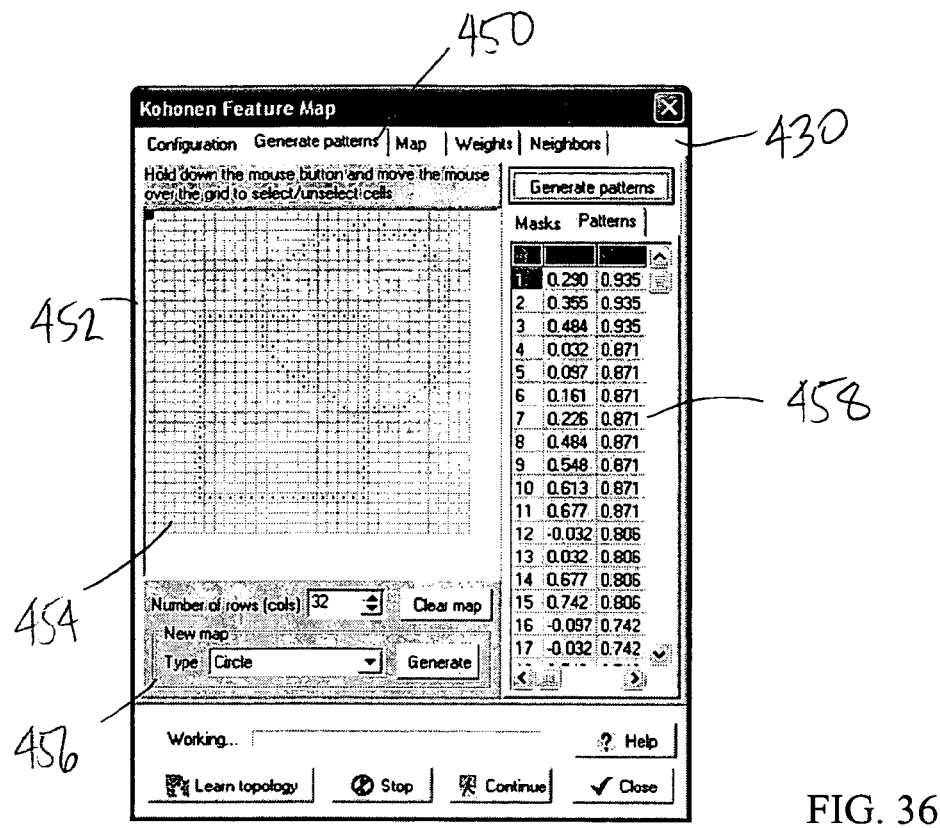

Turning to FIG. 36, the training data can be generated internally rather than via the learning patterns module 108. Selection of a tab 450 reveals a page 452 of the display interface window 430 that acts as an interface to the training set generator available in this module 102. The training set generator may be used to create a normalized point distribution on a map from which the corresponding two-dimensional patterns may be extracted for use in creating the feature map. After training, the network configuration module 102 may provide an option to graph the resulting feature map to support, among other things, a convenient visual comparison with the underlying point distribution of the input patterns.

The page 452 includes a palette section 454 having a grid for entering the point distribution by using the mouse pointer and, for instance, clicking the mouse button or holding it down while over points in the grid. Clicking on a generate patterns button codifies the grid (e.g., "1" for used or selected cells and "0" for unused cells) and produces the training patterns, which may be normalized to the range [−1, +1] in the two dimensions. A section 456 of the page 452 allows the user to customize the dimensions of the grid, as well as automatically generate one of a number of preset patterns (e.g., a circle). After generating the pattern either manually or automatically, the pattern data may be displayed in a table section 458.

Figure 37:
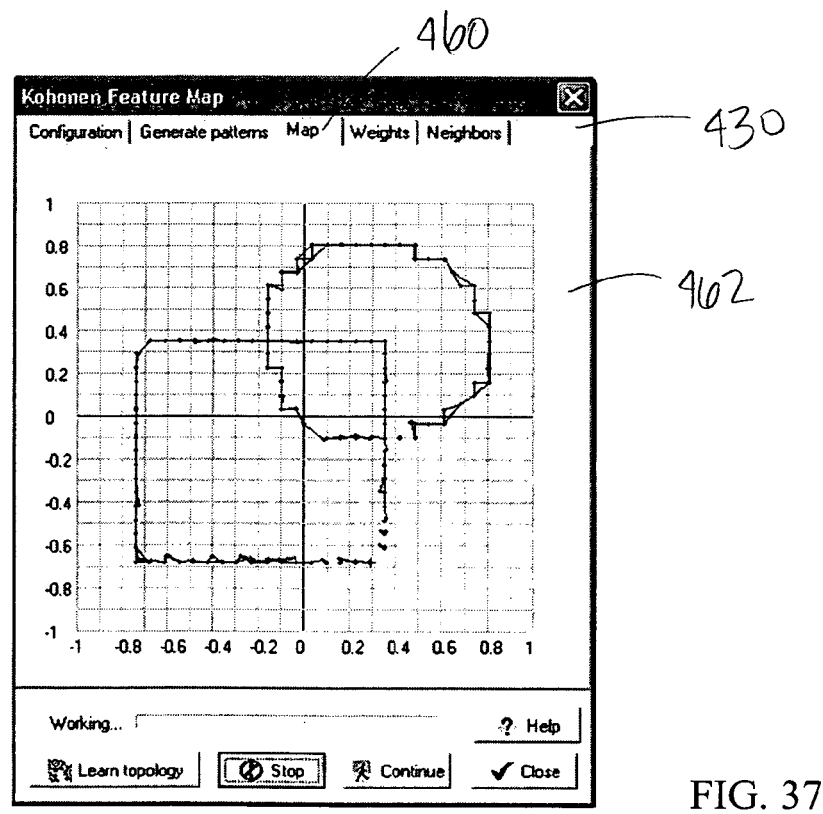
Figure 38:
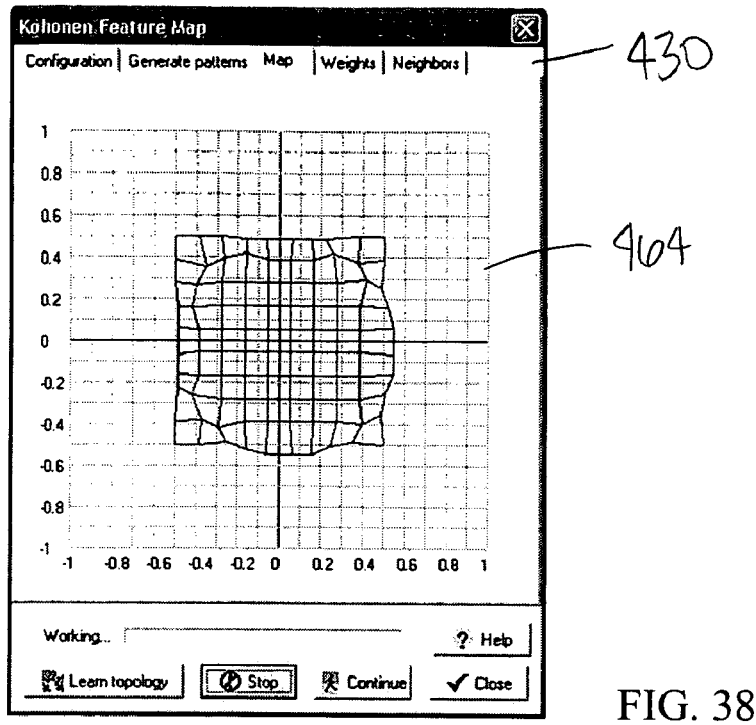

As shown in FIG. 37, selection of a tab 460 reveals a page 462 directed to displaying the feature map. The map may be animated to show the progress during training, both during an iteration as well as after the process has been paused. FIG. 38 shows a resulting map 464 after training on a uniform pattern distribution (differing from the two distributions used for training in FIG. 37).

Figure 39:
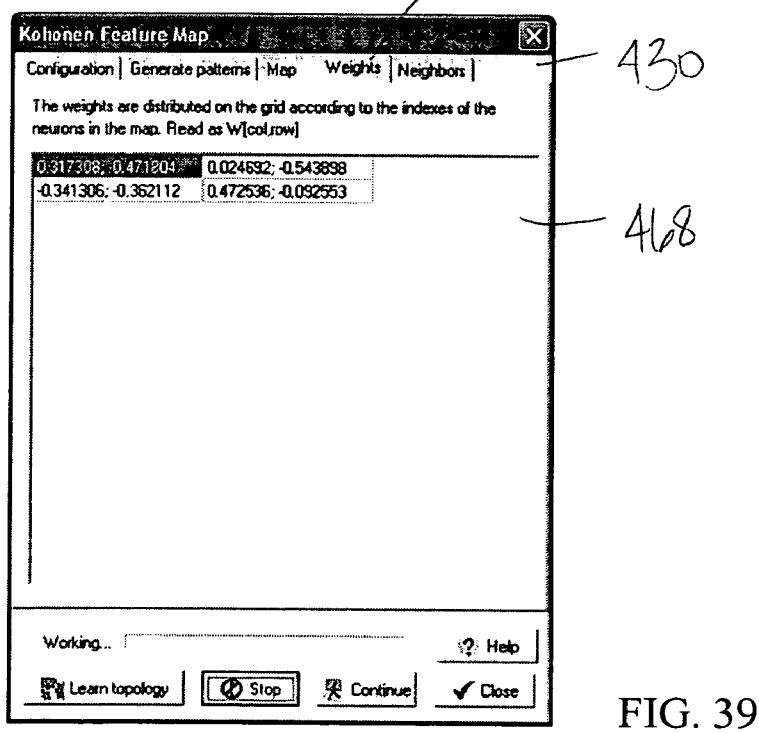

Turning to FIG. 39, selection of a tab 466 reveals a page 468 that presents the resulting weight values in a table, thereby identifying the coordinates of the points drawn on the resulting map (e.g., the map 464). The number of rows and columns may correspond with the dimensions of the output array.

Figure 40:
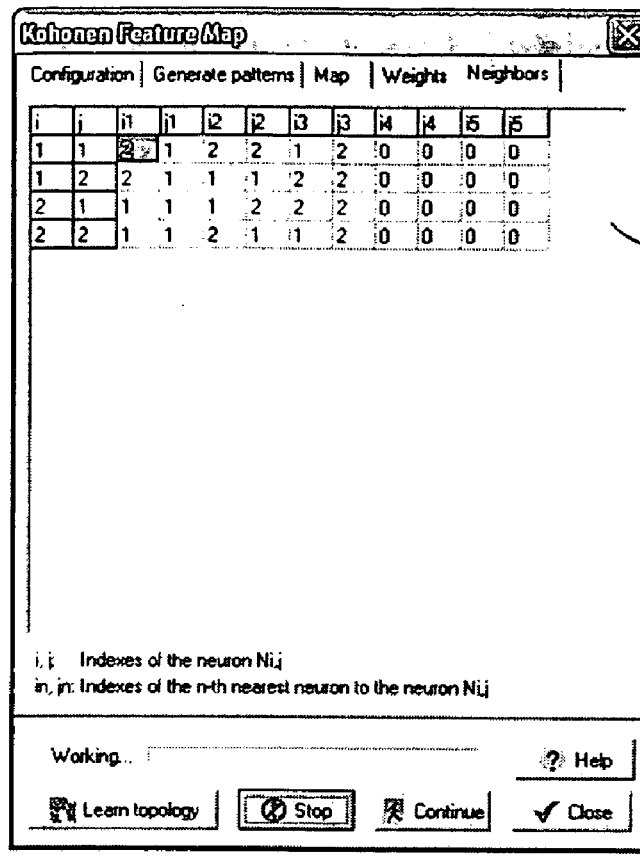

FIG. 40 shows a page 470 of the display interface window 430 having a table that presents the neuron neighbors of each neuron. Neuron identification is provided in terms of the row and column of the resulting map.

Figure 41:
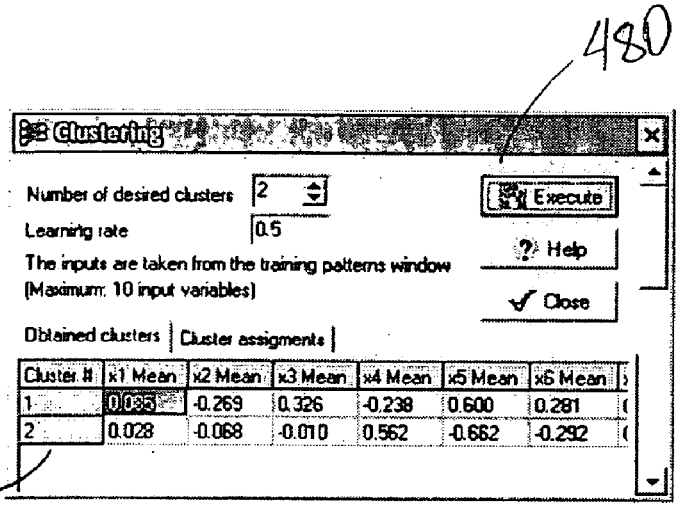
FIGS. 41-42 are simplified depictions of an exemplary window of a display interface generated by a clustering network configuration module.
Figure 42:
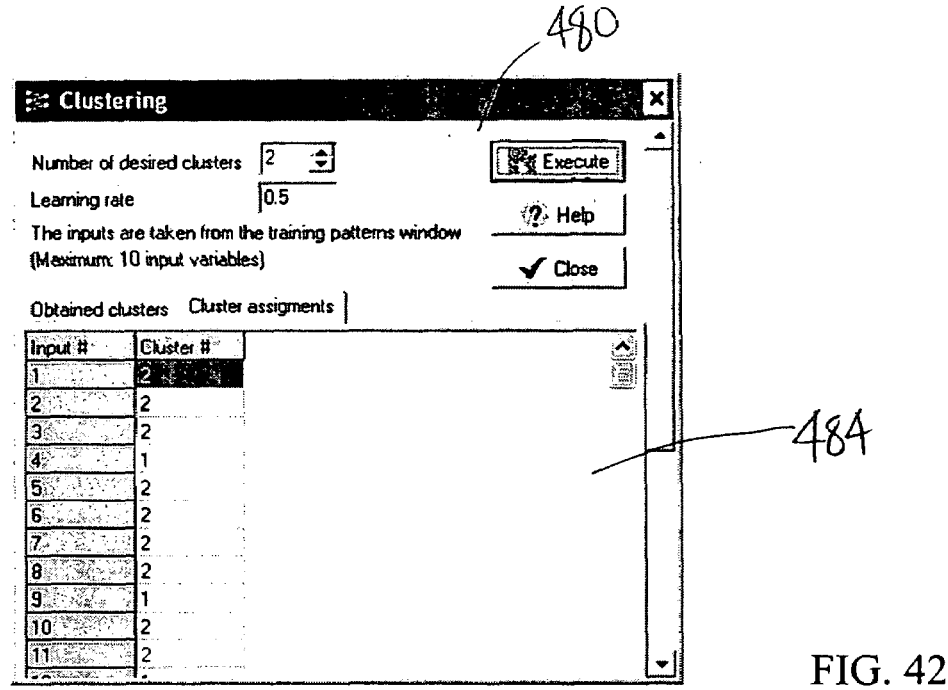

With reference now to FIGS. 41 and 42, the clustering network configuration module 102 may generate a display interface window 480 to support pattern data analysis via a technique driven by the large size of the data sets involved. The analysis clusters the data together into groups, attempting to put similar ones together, to reveal patterns hidden in the data. Predictions can then be made by comparing recent data with the different identified clusters. This type of training requires only the input and determines by itself which classes exist in the input and which input belongs to which class.

The clustering network configuration module 102 generally performs clustering analysis on the data provided by the learning pattern module 108 by also providing options for selecting a desired number of clusters and a learning rate via data input fields presented by the display interface window 480. In alternative embodiments, additional options may be specified, such as a selection of the clustering method. The remainder of the display interface window 480 is generally directed to viewing the resulting clusters, visualizing the resulting "patterns-to-cluster" assignments, observing the distance between the resulting clusters, plotting the results (including a chart personalization option), and displaying different types of linkages between the resulting clusters. In the exemplary embodiment shown, the display interface window 480 includes a tabbed page 482 (FIG. 41) to show the different clusters obtained, and a tabbed page 484 (FIG. 42) to show the patterns-to-cluster assignments. A two-dimensional plot may also be provided via, for instance, the page 484 to plot the two selected dimensions of the training set.

Figure 43:
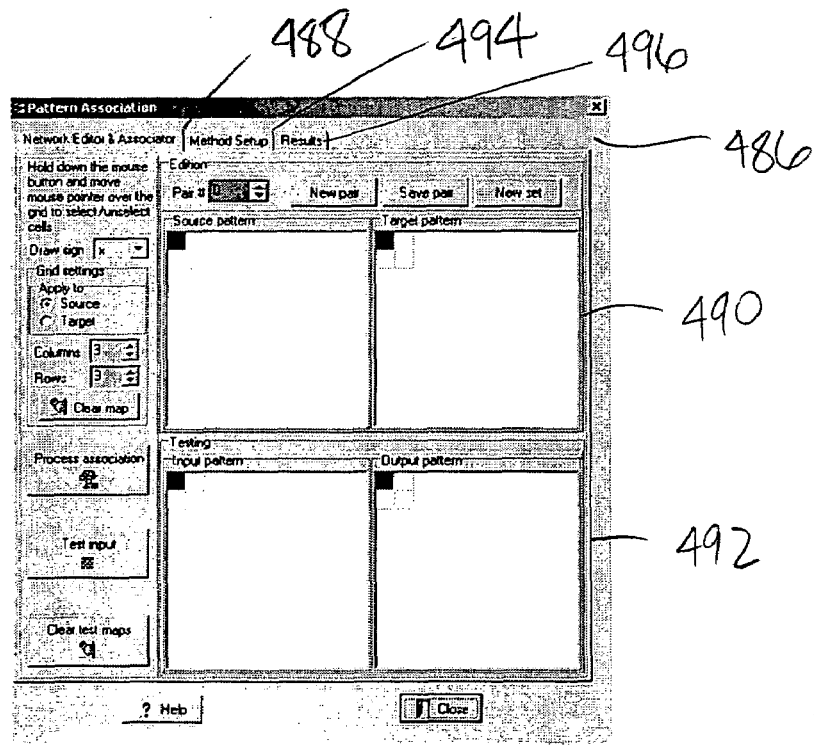
FIG. 43 is a simplified depiction of an exemplary window of a display interface generated by a pattern association network configuration module; and, FIGS. 44 and 45 are simplified depictions of an exemplary window of a display interface generated by a fixed weight network configuration module.

FIG. 43 depicts a display interface window 486 generated by the network configuration module 102 directed to pattern association via associative memory, which allows auto-association as well as hetero-association of patterns. Generally speaking, the pattern association network configuration module 102 performs an association between two different patterns that are entered by the user. To this end, and in accordance with an exemplary embodiment, the display interface window 486 may present three components to the network configuration: pattern editing & testing, algorithm specification, and results displays. Pattern editing and testing may be supported via selection of a tab 488 that reveals a panel 490 having a simple editor for creating source and target patterns, as well as a testing panel 492, where new patterns can be entered and tested. Selection of a tab 494 may provide the user with the option of specifying and customizing the algorithm, method or procedure to be implemented. Lastly, selection of a tab 496 displays the resulting weight matrix details.

Figure 44:
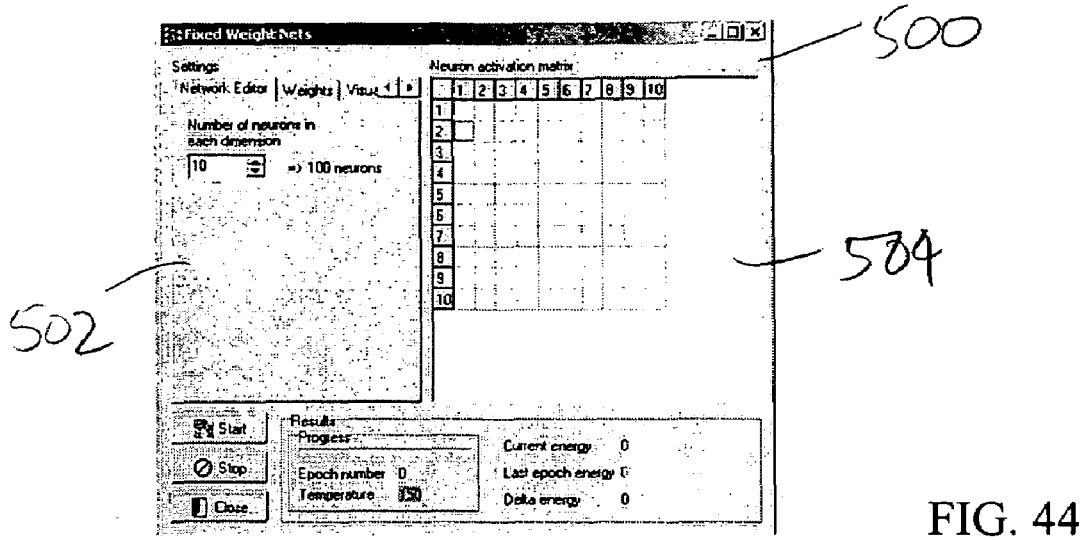
Figure 45:
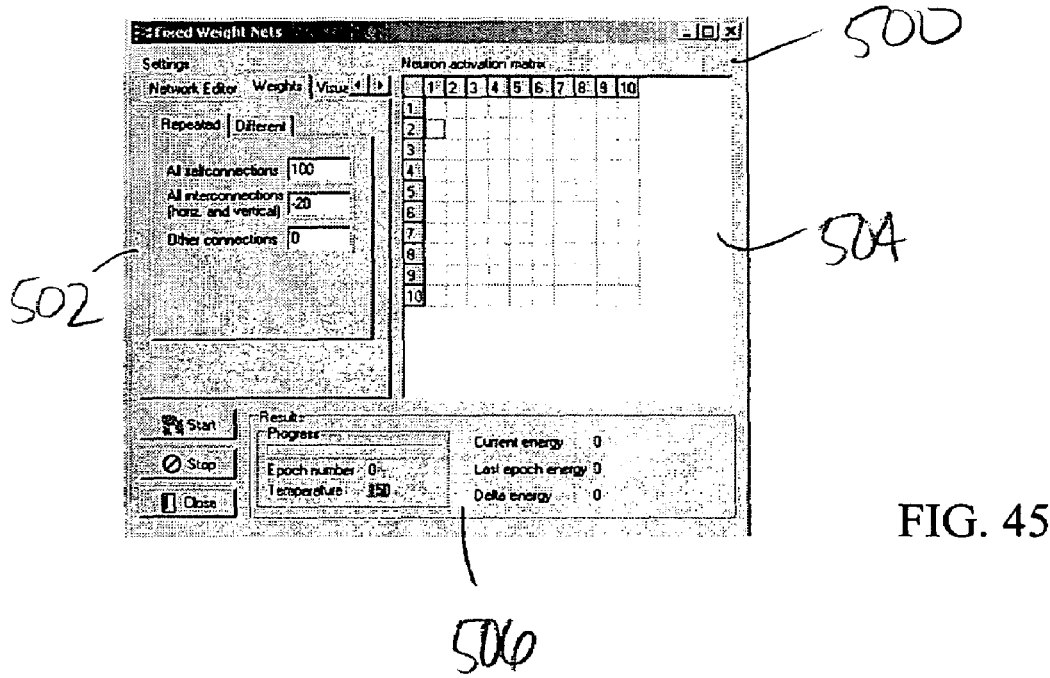

Turning to FIGS. 44 and 45, the fixed weight network configuration module 102 generates a display interface window 500 that generally provides for network editing, weight-related customization, visualization options, and method setting options. More specifically, the display interface window 500 includes a tabbed section 502 having respective tabs for revealing pages corresponding to each of the foregoing configuration areas. Once configured, the network configuration module 102 may display network information in a neuron activation matrix section 504 and a progress panel 506. The neuron activation matrix section 504 shows the results after each iteration, thereby allowing the user to be aware of changes in the status of the network. The options and settings provided via the section 502 present configuration options that are divided in the following categories: (a) topology (to select the number of neurons in the square matrix, (b) weights (to enter the values of the weights), (c) to define how the matrix is going to be visualized (regarding symbols used and time delay for display), and (d) to setup values for the network temperature that are needed for the iterations. After configured, the progress panel 506 may be relied upon to monitor the values of the system after each iteration, which may include data directed to (a) temperature, (b) energy, (c) prior energy, and (d) energy increment.

As described above in connection with a number of exemplary embodiments, the disclosed programming tool broadly enables the configuration, design, evaluation and simulation of a number of different neural network types while removing the programming language requirement that often hampers the effective teaching thereof. Additionally, some of the other aforementioned features of the disclosed programming tool that make it desirable in the educational context (e.g., for facilitating the teaching of neural network design) and elsewhere include (i) code insight into calculation processes, (ii) ease of use and maximal visual interaction (i.e., program interaction mostly via mouse pointer, making keyboard-based inputs rarely required), (iii) compatibility of execution under widely available computing environments and operating systems, (iv) capability of stopping or pausing training and other calculations at any moment during the iterations to view intermediate results or save a network configuration, (v) status as a stand-alone application (i.e. a tool which is not a tool box of another application), (vi) configurable display capabilities (graphics, charts, plots, etc), and (vii) high-speed calculation capability.

As used herein, the term "network configuration" is a broad term not limited to, for instance, the network topology or structure (e.g., neuron layers and connections), but rather includes a specification of, for instance, the weights and bias values, as well as the activation functions of the neurons. More generally, the term "network configuration" may refer to the details or specification of any portion, component, parameter or other aspect of a neural network that may optimized, configured, customized or otherwise modified, before or after any training. As noted and described above, in some embodiments, only the weights and biases are optimized via training. In other cases, the activation functions may also be optimized. In either case, however, the term "network configuration" includes and incorporates data and information regarding each of these aspects or features regardless of whether they are modified through training.

The display interfaces generated by the various modules of the disclosed programming tool may form a portion of a conventional windows operating environment presenting a graphical user interface via any one of a number of different display device types. Accordingly, the display interfaces and any windows thereof may be depicted or rendered via any display device, regardless of format, operating system, or other aspect of the computer or processing system implementing the disclosed programming tool.

The term "module" is used herein in a broad sense to include code, instructions, procedures, etc. that are integrated to any desired extent with the rest of the code underlying the disclosed programming tool. In this way, a module may, but need not, correspond with a separate set of routines, subroutines, or instructions dedicated to the functionality associated with the module.

The term "programming tool" is used herein to broadly refer to the programming of a computer or other programmable device having a processor or processing system for purposes of, for example, either directing the programmable device to execute certain computations in connection with a variety of tasks involved in the creation, use, and testing of artificial neural networks. Thus, the term is not limited to programming for purposes of network design, but rather also includes the programming necessary for execution or implementation of steps involved in the training, evaluation, testing or other implementation of an artificial neural network. That said, one primary example of the programming performed by the "programming tool" involves directing the programmable device to create, design or configure the artificial neural network for such later computations. The term "programming" is accordingly used in a broad sense to refer to a number of different contexts or circumstances under which the programmable device is either receiving, executing, creating, etc. code, routines, procedures or other instructions in connection with the artificial neural network being designed, evaluated or otherwise used or processed. Likewise, the term "tool" is also used in a broad sense to refer to any device that aids in accomplishing the tasks or functionality described herein, and is not limited to any particular form (e.g., software or firmware, distributed or centralized, etc.) or state (e.g., complied, machine language, etc.). Rather, the term "tool" may be used herein to refer to one or more software applications, computer programs, or other entities configured for, capable of, or otherwise directed to implementing the computations, functionality or other steps involved with the artificial neural networks.

The disclosed embodiments may be implemented by a computer having or using any combination of hardware, software, or firmware. Some embodiments may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a computer includes any processing or programmable system that has a processor, such as, for example, a digital signal processor (DSP), a microcontroller, an application specific integrated circuit (ASIC), or a microprocessor.

The disclosed programming tool (and the routines, modules, and other components thereof may be implemented, or written, in Borland Delphi, which uses a PASCAL code structure, or any other high level procedural, object oriented or other programming language. The use of Borland Delphi or other languages with relatively easy syntax may be helpful for those users evaluating the underlying code for further education regarding the neural networks. The programs may also be implemented in assembly or machine language, if desired. In fact, practice of the disclosed system and method is not limited to any particular programming language. In any case, the language may be a compiled or interpreted language.

The disclosed embodiments (and the routines, modules, and other components thereof) may be stored on any computer-readable medium, including without limitation the following tangible storage media or devices (e.g., magnetic disk, read only memory (ROM), random-access memory (RAM), CD-ROM device, flash memory device, digital versatile disk (DVD), or other storage device) readable by a general or special purpose programmable computer, for configuring and operating the computer when the storage media or device is read by the computer to implement or perform the procedures, steps, routines, modules, etc. described herein. The disclosed embodiments may also be considered to be implemented as a machine-readable storage medium. In any case, the disclosed embodiments (and the routines, modules, and other components thereof) may be adapted or configured for use or implementation by or with a computer, where the storage or other computer-readable medium so configured causes the computer to operate in a specific and predefined manner to perform the functions described herein.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A programming tool stored on a computer-readable medium and adapted for implementation by a computer for developing an artificial neural network as a model defined as a set of interconnected artificial neurons, the programming tool comprising:

a network configuration module stored as a first set of instructions on a computer-readable medium that executes on a processor to provide a first display interface and to receive configuration data from a user via the first display interface, and which further executes on a processor to create model data defining a plurality of interconnected artificial neurons for the artificial neural network using the received configuration data and to store the model data in a computer readable memory; and a pattern data module stored as a second set of instructions on a computer readable medium that executes on a processor to provide a second display interface and to receive pattern data including a first pattern data set and a second pattern data set from the user via the second display interface, and which further executes on a processor to train the artificial neural network by changing the stored model data based on the first pattern data set and to test the artificial neural network based on the second pattern data set to thereby test the modeling accuracy of the changed stored model data.

2. The programming tool of claim 1, wherein the second display interface comprises first and second editable tables to support viewing and entering the first and second pattern data sets, respectively.

3. The programming tool of claim 2, wherein the pattern data module comprises an automatic table setup routine for configuring the first editable table or the second editable table in accordance with the configuration of the artificial neural network.

4. The programming tool of claim 1, wherein the pattern data module comprises a data plotting routine such that the second display interface comprises a graph for viewing the first pattern data set or the second pattern data set.

5. The programming tool of claim 1, wherein the pattern data module comprises a pattern data generation routine to support the establishment of the first pattern data set or the second pattern data set graphically via user selection of cells of a two-dimensional space presented visually in the second display interface.

6. The programming tool of claim 1, wherein the pattern data module comprises a pattern data analysis routine that identifies duplicative patterns and conflicting patterns within either the first pattern data set or the second pattern data set.

7. The programming tool of claim 1, wherein the pattern data module comprises a pattern data analysis routine that identifies unnecessary variables of either the first pattern data set or the second pattern data set.

8. The programming tool of claim 1, wherein the pattern data module comprises a pattern data randomization routine to support an establishment or a modification of a selected portion of either the first pattern data set or the second pattern data set with random data values.

9. The programming tool of claim 8, further comprising a random number generation module stored as a third set of instructions on the computer-readable medium that executes on a processor to provide a third display interface to enable selection of one of a plurality of random number generation functions for use in determining the random values.

10. The programming tool of claim 1, wherein the second display interface supports selection of a subset of the first pattern data set for validation testing of the artificial neural network.

11. The programming tool of claim 1, wherein the second pattern data set is a subset of the first pattern data set.

12. The programming tool of claim 1, wherein the second display interface allows the user to adjust validation testing timing.

13. The programming tool of claim 1, wherein the second display interface presents access to a tool for implementing generalization testing on the first pattern data set or the second pattern data set to compute classification error for the artificial neural network.

14. The programming tool of claim 13, further comprising a network evaluation module to provide a third display interface for generation of a performance metric of the artificial neural network based on the generalization testing.

15. The programming tool of claim 1, wherein the network configuration module comprises a neuron configuration tool to select and configure one of a plurality of neurons of the artificial neural network.

16. The programming tool of claim 15, wherein the neuron configuration tool comprises an input panel to specify for the selected neuron an activation function, a bias, a learning rate, or a weight.

17. The programming tool of claim 16, further comprising activation function customization module to establish one or more parameters for the activation function.

18. The programming tool of claim 17, wherein a slope parameter of the activation function is optimized via training of the artificial neural network via the first pattern data set.

19. The programming tool of claim 1, further comprising a code display module to provide a third display interface to present code indicative of an algorithm used in training the artificial neural network.

20. The programming tool of claim 1, wherein the first display interface comprises a graphical editing panel to support topographical configuration of the artificial neural network via placement of graphical representations of network components on the graphical editing panel.

21. A programming tool stored on a computer-readable medium and adapted for implementation by a computer for developing an artificial neural network as a model stored on a computer-readable medium, the programming tool comprising:
a network configuration module stored as a first set of instructions on a computer-readable medium that executes on a processor to provide a first display interface, and to receive a configuration data from a user via the first display interface, and which further executes on a processor to create model data defining a plurality of interconnected artificial neurons for the artificial neural network using the received configuration data and to store the model data in a computer readable memory;
a pattern data module stored as a second set of instructions on the computer-readable medium that executes on a processor to provide a second display interface and to receive a pattern data from the user via the second display interface, and which further executes on a processor to test the artificial neural network using the pattern data and to produce a testing result, and which further displays the testing result on the second display interface; and
a network evaluation module stored as a third set of instructions on the computer-readable medium that executes on a process to provide a third display interface that generates a performance metric based on the testing of the artificial neural network and provides the performance metric to the user on the third display interface.

22. The programming tool of claim 21, wherein the network evaluation module comprises a routine to implement receiver operating characteristics (ROC) analysis such that the performance metric comprises an indication of classification performance.

23. The programming tool of claim 21, wherein the network evaluation module comprises a routine to implement confusion matrix analysis.

24. The programming tool of claim 21, wherein the artificial neural network is designed for two-category classification, and wherein the programming tool further comprises a support vector machines module stored as a fourth set of instructions on a computer readable medium that executes on a processor to provide a performance comparison for the artificial neural network.

25. The programming tool of claim 21, wherein the first display interface comprises a graphical editing panel to enable the user to perform a topographical configuration of the artificial neural network via placement of graphical representations of network components on the graphical editing panel.

26. The programming tool of claim 21, further comprising a supervised learning module stored as a fourth set of instructions on a computer readable medium and comprising a tool executed on a processor to pause training of the artificial neural network for viewing status information for components of the artificial neural network at an intermediate phase of the training.

27. The programming tool of claim 21, wherein the artificial neural network is a feedforward network, and wherein the network evaluation module comprises a decision function tool to provide a graphical representation of discriminate planes of the feedforward network.

28. A programming tool stored on a computer-readable medium and adapted for implementation by a computer for developing an artificial neural network as a model defined as a set of interconnected artificial neurons, the programming tool comprising:

a network configuration module stored as a first set of instructions on a computer-readable medium that executes on a processor to provide a first display interface and to receive configuration data from a user via the first display interface, and which further executes on a processor to create model data defining a plurality of interconnected artificial neurons for the artificial neural network using the received configuration data and to store the model data in a computer readable memory, wherein model data is associated with at least one real world phenomenon; and a pattern data module stored as a second set of instructions on the computer-readable medium that executes on a processor to provide a second display interface and to receive a pattern data from the user via the second display interface, which further executes on the processor to train the artificial neural network by changing the stored model data based on the pattern data, and which further executes on the processor to test the artificial neural network using the pattern data and to produce a testing result, and which further displays the testing result on the second display interface.

* * * * *

UNITED STATES PATENT AND TRADEMARK OFFICE
CERTIFICATE OF CORRECTION

PATENT NO.         : 7,502,763 B2
APPLICATION NO.    : 11/203510
DATED              : March 10, 2009
INVENTOR(S)        : Melvin Ayala et al.

It is certified that error appears in the above-identified patent and that said Letters Patent is hereby corrected as shown below:

On the Title Page:

At Item (75), second named Inventor, "Adjoundi" should be -- Adjouadi --.

Signed and Sealed this

Sixth Day of April, 2010

David J. Kappos
*Director of the United States Patent and Trademark Office*